US009813523B2

(12) United States Patent
Bar Bracha et al.

(10) Patent No.: US 9,813,523 B2
(45) Date of Patent: Nov. 7, 2017

(54) APPARATUS, METHOD AND SYSTEM OF QUALITY OF EXPERIENCE INDICATION

(71) Applicant: INTEL IP CORPORATION, Santa Clara, CA (US)

(72) Inventors: Vered Bar Bracha, Hod HaSharon (IL); Tal Azogui, Ganot Hadar (IL)

(73) Assignee: INTEL IP CORPORATION, Santa Clara, CA (US)

(*) Notice: Subject to any disclaimer, the term of this patent is extended or adjusted under 35 U.S.C. 154(b) by 66 days.

(21) Appl. No.: 14/864,939

(22) Filed: Sep. 25, 2015

(65) Prior Publication Data

US 2016/0278107 A1    Sep. 22, 2016

Related U.S. Application Data

(60) Provisional application No. 62/133,593, filed on Mar. 16, 2015.

(51) Int. Cl.
*H04L 29/08* (2006.01)
*H04L 29/06* (2006.01)

(52) U.S. Cl.
CPC .......... *H04L 67/36* (2013.01); *H04L 65/1066* (2013.01); *H04L 65/80* (2013.01)

(58) Field of Classification Search
CPC ........... H04W 72/085; H04W 72/1226; H04W 72/1231; H04W 28/0231; H04L 65/1066;

(Continued)

(56) References Cited

U.S. PATENT DOCUMENTS 9,585,030 B2 *    2/2017  Lau ................... H04W 24/02
2008/0155087 A1 *  6/2008  Blouin ............... H04L 43/0817
                                                         709/223

(Continued)

FOREIGN PATENT DOCUMENTS

| CN | EP2779718    | * | 6/2012  | ........... H04W 8/22  |
| CN | WO2016055022 | * | 4/2016  | ........... H04W 28/24 |
| FI | WO2014166523 | * | 10/2013 | ........... H04L 29/06 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Warner Wong
(74) *Attorney, Agent, or Firm* — Shichrur & Co.

(57) ABSTRACT

Some demonstrative embodiments include devices, systems and methods of quality of experience indication. For example, an apparatus may include a radio configured to communicate encoded multimedia data during a session over a wireless communication channel; and a Quality of Experience (QoE) estimator configured to determine at least one QoE indicator corresponding to the session, and to provide the QoE indicator to a session manager of the session, the QoE estimator configured to determine the QoE indicator based at least on a mean opinion score (MOS) corresponding to the encoded multimedia data, and a channel quality parameter corresponding to the wireless communication channel.

23 Claims, 6 Drawing Sheets

(58) Field of Classification Search
CPC ....... H04L 65/80; H04L 67/36; H04L 1/0026; H04L 12/2634; H04L 29/06523; H04L 41/5009; H04L 41/5067
See application file for complete search history.

(56) References Cited

U.S. PATENT DOCUMENTS

| | | | |
|---|---|---|---|
| 2010/0029266 A1* | 2/2010 | van Gassel | H04L 41/5009 455/424 |
| 2012/0155398 A1* | 6/2012 | Oyman | H04L 47/26 370/329 |
| 2013/0223207 A1* | 8/2013 | Bouchard | H04L 47/26 370/229 |
| 2013/0286868 A1* | 10/2013 | Oyman | H04W 24/06 370/252 |
| 2013/0298170 A1* | 11/2013 | ElArabawy | H04W 28/0231 725/62 |
| 2014/0169446 A1* | 6/2014 | Yang | H04N 19/172 375/240.02 |
| 2014/0179238 A1* | 6/2014 | Wynn | H04L 41/5067 455/67.11 |
| 2014/0185474 A1* | 7/2014 | Martins | H04L 41/5009 370/252 |
| 2015/0103137 A1* | 4/2015 | Eisenberg | H04N 7/152 348/14.09 |
| 2015/0163152 A1* | 6/2015 | Li | H04L 47/2441 370/409 |
| 2015/0200993 A1* | 7/2015 | Assem | H04L 43/0829 370/352 |
| 2015/0244580 A1* | 8/2015 | Saavedra | H04L 41/0816 709/221 |
| 2015/0244634 A1 | 8/2015 | Azogui et al. | |
| 2015/0264104 A1* | 9/2015 | Dunne | H04L 47/24 709/224 |
| 2015/0271496 A1 | 9/2015 | Choi et al. | |
| 2015/0365871 A1* | 12/2015 | Hu | H04W 72/0453 370/331 |
| 2016/0381116 A1* | 12/2016 | Hui | H04L 67/1097 455/425 |

OTHER PUBLICATIONS

W3C, WebRTC 1.0: Real-time Communication Between Browsers, W3C Working Draft, Sep. 10, 2013, 38 pages.

* cited by examiner

APPARATUS, METHOD AND SYSTEM OF QUALITY OF EXPERIENCE INDICATION

CROSS REFERENCE

This application claims the benefit of and priority from U.S. Provisional Patent Application No. 62/133,593 entitled "Apparatus, method and system of video quality indication", filed Mar. 16, 2015, the entire disclosure of which is incorporated herein by reference.

TECHNICAL FIELD

Embodiments described herein generally relate to a quality of experience (QoE) indication.

BACKGROUND

The Mobile Multimedia certification program attempts to certify the IEEE 802.11 Standard based features across a broad spectrum of Wi-Fi devices, along with consistent guidelines and deployment best practices, for example, to ensure a high quality and robust user experience for real-time multimedia. These features may be used in a variety of Wi-Fi network deployments, including public hotspots, enterprise deployments and residential homes.

In recognition of the diversity of products covered by the program, and the range of requirements for different deployments and markets, the basic Mobile Multimedia certification covers common features needed for all use cases, and a bundle of advanced features which are conditionally certified for products that target advanced use cases.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
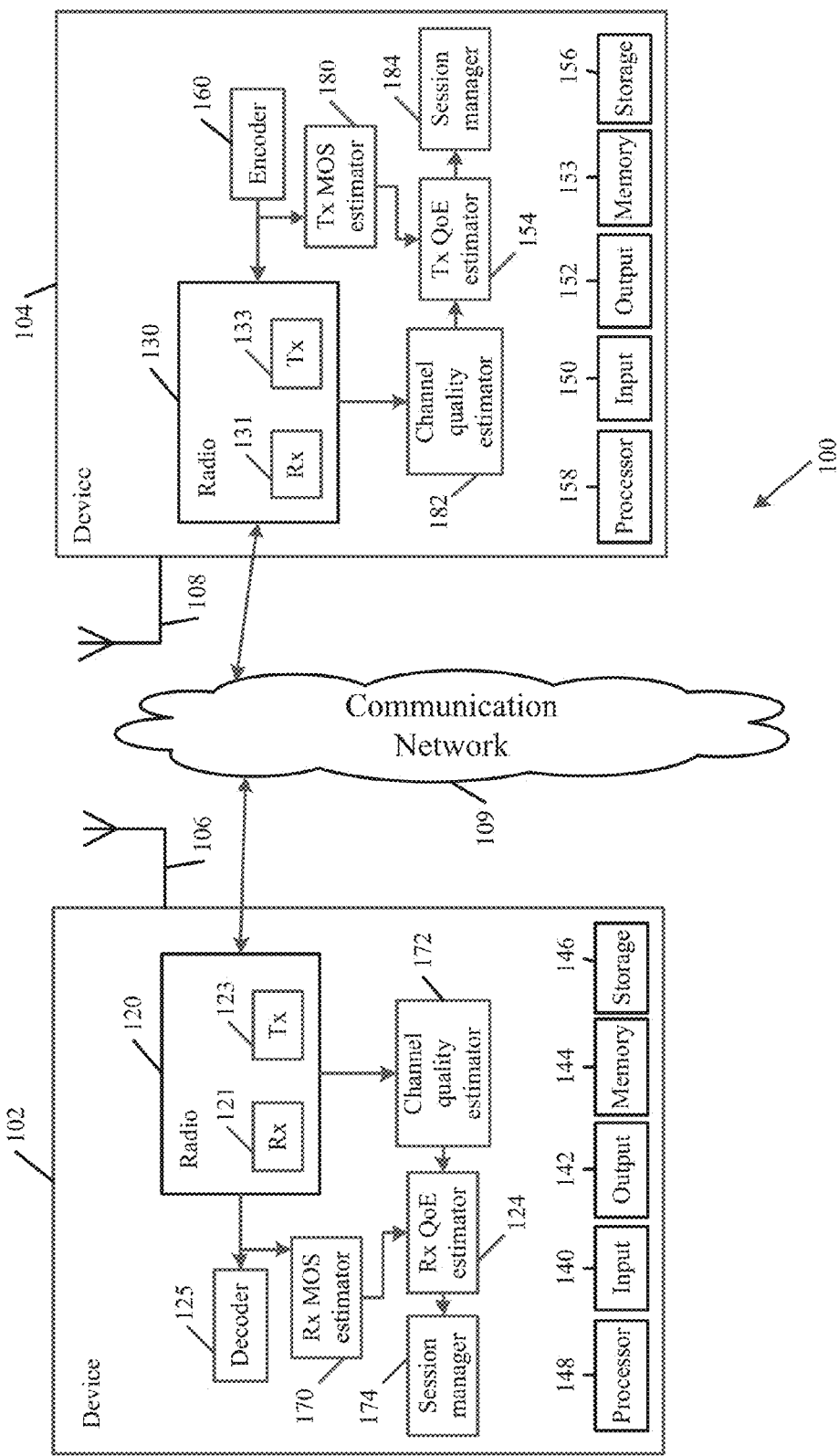
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Web Real-Time Communication standards (*WebRTC 1.0: Real-time Communication Between Browsers, W3C Working Draft 10 Sep. 2013*) and/or future versions and/or derivatives thereof, IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29,*

2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless IAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing WiFi Alliance (WFA) Peer-to-Peer (P2P) specifications (WiFi P2P technical specification, version 1.5, Aug. 4, 2015) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communication device", as used herein, includes, for example, a device capable of wireless and/or wired communication, a communication device capable of wireless and/or wired communication, a communication station capable of wireless and/or wired communication, a portable or non-portable device capable of wireless and/or wired communication, or the like. In some demonstrative embodiments, a communication device may be or may include a peripheral that is integrated with a computer, or a peripheral that is attached to a computer.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to processing multimedia data including video data.

Some demonstrative embodiments are described herein with respect to processing video data in real time.

Other embodiments may include any other processing of any other additional or alternative type of data, for example, video data and/or any non-video data, e.g., audio data, graphic data, gaming data, movie data, video conferencing data, video call data, and the like.

Reference is now made to FIG. 1, which schematically illustrates a block diagram of a system 100, in accordance with some demonstrative embodiments.

In some demonstrative embodiments, system 100 may include one or more devices, e.g., devices 102 and 104, capable of communicating over at least one communication network 109.

In some demonstrative embodiments, devices 102 and/or 104 may include a mobile device or a non-mobile, e.g., a static, device.

For example, devices 102 and/or 104 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a multimedia device, a streamer device, a gaming device, a data source, a data sink, a Digital Still camera (DSC), a media player, a Smartphone, a television, a music player, or the like.

In some demonstrative embodiments, device 102 may include, for example, one or more of a processor 148, an input unit 140, an output unit 142, a memory unit 144, and/or a storage unit 146; and/or device 104 may include, for example, one or more of a processor 158, an input unit 150, an output unit 152, a memory unit 153, and/or a storage unit 156. Devices 102 and/or 140 may optionally include other suitable hardware components and/or software components. In some demonstrative embodiments, some or all of the components of one or more of devices 102 and/or 104 may be enclosed in a common housing or packaging, and may be interconnected or operably associated using one or more wired or wireless links. In other embodiments, components of one or more of devices 102 and/or 104 may be distributed among multiple or separate devices.

In some demonstrative embodiments, processor 148 and/or processor 158 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 148 may execute instructions, for example, of an Operating System (OS) of device 102 and/or of one or more suitable applications. Processor 158 may execute instructions, for example, of an Operating System (OS) of device 104 and/or of one or more suitable applications.

In some demonstrative embodiments, input unit 140 and/or input unit 150 may include, for example, a keyboard, a keypad, a mouse, a touch-screen, a touch-pad, a track-ball, a stylus, a microphone, or other suitable pointing device or input device. Output unit 142 and/or output unit 152 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 144 and/or memory unit 153 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 146 and/or storage unit 156 may include, for example, a hard disk drive, a floppy disk drive, a Compact Disk (CD) drive, a CD-ROM drive, a DVD drive, or other suitable removable or non-removable storage units. Memory unit 144 and/or storage unit 146, for example, may store data processed by device 102. Memory unit 153 and/or storage unit 156, for example, may store data processed by device 104.

In some demonstrative embodiments, devices 102 and/or 104 may be capable of communicating content, data, information and/or signals via communication network 109.

In some demonstrative embodiments, communication network 109 may include one or more wireless communication networks, one or more wired communication networks, and/or any combination of one or more wireless communication networks and/or one or more wired communication networks. For example, communication network 109 may include at least one wireless communication network to communicate over a radio channel, a cellular channel, an RF channel, a WiFi channel, an IR channel, a Bluetooth (BT) channel, a Global Navigation Satellite System (GNSS) Channel, and the like.

In some demonstrative embodiments, devices 102 and/or 104 may include one or more radios including circuitry and/or logic to perform wireless communication between devices 102, 104 and/or one or more other wireless communication devices. For example, device 102 may include a radio 120, and/or device 104 may include a radio 130.

In some demonstrative embodiments, radios 120 and/or 130 may include one or more wireless receivers (Rx) including circuitry and/or logic to receive wireless communication signals, RF signals, frames, blocks, transmission streams, packets, messages, data items, and/or data. For example, radio 120 may include a receiver 121, and/or radio 130 may include a receiver 131.

In some demonstrative embodiments, radios 120 and/or 130 may include one or more wireless transmitters (Tx) including circuitry and/or logic to send wireless communication signals, RF signals, frames, blocks, transmission streams, packets, messages, data items, and/or data. For example, radio 120 may include a transmitter 123, and/or radio 130 may include a transmitter 133.

In some demonstrative embodiments, radios 120 and/or 130, transmitters 123 and/or 133, and/or receivers 121 and/or 131 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 120 and/or 130 may include or may be implemented as part of a wireless Network Interface Card (NIC), a communication card, a modulator-demodulator (modem), and the like.

In some demonstrative embodiments, radios 120 and/or 130 may include, or may be associated with, one or more antennas 106 and/or 108, respectively.

In one example, device 102 may include a single antenna 106. In another example, device 102 may include two or more antennas 106.

In one example, device 104 may include a single antenna 108. In another example, device 104 may include two or more antennas 108.

Antennas 106 and/or 108 may include any type of antennas suitable for transmitting and/or receiving wireless communication signals, blocks, frames, transmission streams, packets, messages and/or data. For example, antennas 106 and/or 108 may include any suitable configuration, structure and/or arrangement of one or more antenna elements, components, units, assemblies and/or arrays. Antennas 106 and/or 108 may include, for example, antennas suitable for directional communication, e.g., using beamforming techniques. For example, antennas 106 and/or 108 may include a phased array antenna, a multiple element antenna, a set of switched beam antennas, and/or the like. In some embodiments, antennas 106 and/or 108 may implement transmit and receive functionalities using separate transmit and receive antenna elements. In some embodiments, antennas 106 and/or 108 may implement transmit and receive functionalities using common and/or integrated transmit/receive elements.

In some demonstrative embodiments, device 104 may be configured to operate as and/or perform the functionality of a Transmit (Tx) side, which may be configured to transmit data; and/or device 102 may be configured to operate as and/or perform he functionality of a Receive (Rx) side, which may be configured to receive and process the data from the Tx side, e.g., as described below.

In some demonstrative embodiments, device 104 may optionally be configured to operate as and/or perform the functionality of an Rx side, and/or device 102 may optionally be configured to operate as and/or perform the functionality of a Tx side.

In some demonstrative embodiments, device 104 may include an encoder 160 including circuitry and/or logic configured to encode multimedia data to be transmitted by device 104, e.g., to device 102.

In some demonstrative embodiments, the multimedia data may include video data, e.g., as described below. In other embodiments, the multimedia data may include any additional or alternative type of data.

In some demonstrative embodiments, encoder 160 may include a video encoder, e.g., including video encoding circuitry and/or video encoding logic configured to encode video data according to a video encoding scheme and/or format. In other embodiments, encoder 160 may include any other encoder configured to encode any other additional or alternative type of data, e.g., audio data, graphic data, gaming data, and the like.

In some demonstrative embodiments, device 102 may include a decoder 125 including circuitry and/or logic to decode encoded multimedia data received at device 102. For example, decoder 125 may include a video decoder to decode the encoded video encoded by encoder 160. For example, decode 125 may include a video decoder, e.g., including video decoding circuitry and/or video decoding logic configured to decode video data according to a video decoding scheme and/or format. In other embodiments, decoder 125 may include any other decode to configured to decode any other type of data, e.g., audio data, graphic data, gaming data, and the like.

In some demonstrative embodiments, device 102 and/or device 104 may include a session manager configured to manage a session to communicate multimedia data between devices 102 and 104, e.g., as described below. For example, device 102 may include a session manager 174, and/or device 104 may include a session manager 184. Session manager 174 may be configured to perform one or more communications, functionalities, operations and/or procedures at device 102, and/or session manager 184 may be configured to perform one or more communications, functionalities, operations and/or procedures at device 104, e.g., as described below.

In some demonstrative embodiments, session manager 174 and/or session manager 184 may include circuitry and/or logic, e.g., one or more processors including circuitry and/or logic, memory circuitry and/or logic, session management circuitry and/or logic, OS circuitry and/or logic, Media-Access Control (MAC) circuitry and/or logic, Physical Layer (PHY) circuitry and/or logic, and/or any other circuitry and/or logic, configured to perform the functionality of session managers 174 and/or 184. Additionally or alternatively, one or more functionalities of session managers 174 and/or 184 may be implemented by logic, which may be executed by a machine and/or one or more processors, e.g., as described below.

In some demonstrative embodiments, session manager 184 may be configured to control, trigger, and/or cause one or more elements of device 104 to generate, process, and/or transmit multimedia data to device 102 during a session between devices 102 and 104.

In some demonstrative embodiments, session manager 184 may be configured to control, trigger, and/or cause encoder 160 to generate encoded multimedia data to be transmitted to device 102; and to control, trigger, and/or cause transmitter 133 to transmit the encoded multimedia during the session, for example, over a wireless communication channel between devices 102 and 104.

In some demonstrative embodiments, session manager 174 may be configured to control, trigger, and/or cause one or more elements of device 102 to process the encoded multimedia data received from device 104 during the session between devices 102 and 104.

In some demonstrative embodiments, session manager 174 may be configured to control, trigger, and/or cause receiver 121 to process receipt of the encoded multimedia data during the session, for example, over the wireless communication channel between devices 102 and 104; and to control, trigger, and/or cause decoder 125 to decode the encoded multimedia data received from device 102.

In some demonstrative embodiments, device 102 and/or device 104 may include a Quality of Experience (QoE) estimator configured to determine, estimate, calculate, measure, signal, and/or indicate one or more parameters and/or indicators of a Quality of Experience (QoE) corresponding to the session, e.g., as described below. For example, device 104 may include a Transmit (Tx) QoE estimator 154 including circuitry and/or logic configured to determine, estimate, calculate, measure, signal, and/or indicate one or more Tx QoE parameters and/or indicators at the Tx side of a session, for example, the session between devices 102 and 104; and/or device 102 may include a Receive (Rx) QoE estimator 124 including circuitry and/or logic configured to determine, estimate, calculate, measure, signal, and/or indicate one or more Rx QoE parameters and/or indicators at the Rx side of a session, for example, the session between devices 102 and 104, e.g., as described below.

In some demonstrative embodiments, the Tx QoE and/or the Rx QoE parameters may be configured to combine, for example, visual impact of encoding and network related artifacts, for example, at the Rx side and/or the TX side, e.g., as described below.

In some demonstrative embodiments, Tx QoE estimator 154 may be configured to determine at least one Tx QoE indicator corresponding to the session, and to provide the at least one Tx QoE indicator to session manager 184, e.g., as described below.

In some demonstrative embodiments, session manager 184 may be configured to manage the session between devices 102 and 104 based, for example, at least on the at least one Tx QoE indicator from the Tx QoE estimator 154, e.g., as described below.

In some demonstrative embodiments, session manager 184 may be configured to, based at least on the Tx QoE indicator, trigger, control and/or cause device 104 to at least, for example, change an encoding rate of the encoded multimedia data, e.g., as encoded by encoder 160, and/or to switch the session from the wireless communication channel to another wireless communication channel, e.g., as described below, and/or to perform any additional or alternative operation.

In some demonstrative embodiments, Rx QoE estimator 124 may be configured to determine at least one Rx QoE indicator corresponding to the session, and to provide the at least one Rx QoE indicator to session manager 174, e.g., as described below.

In some demonstrative embodiments, session manager 174 may be configured to manage the session between devices 102 and 104 based, for example, at least on the at least one Rx QoE indicator from the Rx QoE estimator 124, e.g., as described below.

In some demonstrative embodiments, session manager 174 may be configured to, based at least on the at least one Rx QoE indicator, trigger, control and/or cause device 102 to at least, for example, change an encoding rate of the encoded multimedia data, e.g., by sending to device 104 a request to change the encoding rate of encoder 160, and/or to switch the session from the wireless communication channel to another wireless communication channel, e.g., as described below, and/or to perform any additional or alternative operation.

In some demonstrative embodiments, the Rx QoE and/or the Tx QoE indicators may be configured to provide at the Rx side and/or the Tx side, e.g., independently, a visual quality score, for example, for interoperability testing and/or for connectivity interface selection/switching, e.g., as described below.

In other embodiments, the Rx QoE and/or the Tx QoE indicators may include, may represent, and/or may be based on, any other additional or alternative parameters.

In some demonstrative embodiments, various proprietary solutions for enterprises, which endeavor to address the performance and quality of experience (QoE) of real-time multimedia applications over Wi-Fi networks, may not be sufficient and/or suitable, for one or more devices, systems, networks, use cases, deployments, and/or implementations. For example, due to the proprietary nature of these proprietary solutions, there is a lack of interoperability and end user quality of experience varies from one solution to another.

In some demonstrative embodiments, cellular network providers may utilize mobile data offloading (MDO) onto Wi-Fi hotspots. According to "Cisco Visual Networking Index (VNI): Global Mobile Data Traffic Forecast, 2012-2017", Feb. 6, 2013, the percentage of total mobile data traffic carried over Wi-Fi will increase from 33 percent in 2012 (429 petabytes per month) to 46 percent by 2017 (9.6 exabytes per month) of the total global mobile data traffic. However, if Wi-Fi systems cannot meet the expectations of the operators as interactive mobile multimedia usage grows, the adoption of Wi-Fi for MDO may be limited.

In some demonstrative embodiments, devices 102 and/or 104 may be configured to perform one or more operations of connectivity access management (CAM), e.g., as described below.

In some demonstrative embodiments, devices 102 and/or 104 may be configured to perform one or more operations in accordance with a CAM program, and/or a certification program, e.g., a Mobile Multimedia certification program, or any other program, method, and/or protocol, e.g., as described below.

In some demonstrative embodiments, the CAM program may define guidelines and/or deployment best practices for intelligent wireless interface selection and/or to ensure a high quality and/or robust user experience for real-time multimedia, and/or any other operations, functionalities and/or criteria.

In some demonstrative embodiments, devices 102 and/or 104 may be configured to generate, communicate, and/or process one or more QoE indicators, metrics and/or parameters, for example, including the at least one Tx QoE indicator and/or the at least one Rx QoE indicator, e.g., as described below.

In some demonstrative embodiments, devices 102 and/or 104 may be configured to generate, communicate, and/or process the at least one Tx QoE indicator and/or the at least one Rx QoE indicator, which may be based, for, example, on at least one metric corresponding to the encoded multimedia data, and/or at least one metric corresponding to a quality of the wireless communication channel over which the encoded multimedia data is to be communicated, e.g., as described below.

In some demonstrative embodiments, devices 102 and/or 104 may be configured to generate, communicate, and/or process the at least one Tx QoE indicator and/or the at least one Rx QoE indicator, which may be based, for example, on a combination of the metric corresponding to the encoded multimedia data, and the metric corresponding to the quality of the wireless communication channel, e.g., as described below.

In some demonstrative embodiments, devices 102 and/or 104 may be configured to generate, communicate, and/or process the at least one Tx QoE indicator and/or the at least one Rx QoE indicator, which may be based, for example, on independent metrics for the Transmit (Tx) side, relay, and/or the Receive (Rx) side, e.g., as described below.

In some demonstrative embodiments, devices 102 and/or 104 may be configured to generate, communicate, and/or process the at least one Tx QoE indicator and/or the at least one Rx QoE indicator, which may be based, for example, on low computation, real-time, channel capacity quality, for example, using a goodput rate estimator, e.g., as described below.

In some demonstrative embodiments, devices 102 and/or 104 may be configured to generate, communicate, and/or process the at least one Tx QoE indicator and/or the at least one Rx QoE indicator, which may be based, for example, on low computation, real-time, Visual quality, for example, using a Mean Opinion Score (MOS) estimator, e.g., as described below.

In some demonstrative embodiments, Tx QoE estimator 154 may be configured to determine the at least one Tx QoE indicator based at least on a transmit-side (Tx) mean opinion score (Tx MOS) corresponding to the encoded multimedia data, and a channel quality parameter corresponding to the wireless communication channel, e.g., as described below.

In some demonstrative embodiments, Rx QoE estimator 124 may be configured to determine the at least one Rx QoE indicator based at least on a receive-side (Rx) mean opinion score (Rx MOS) corresponding to the encoded multimedia data, and a channel quality parameter corresponding to the wireless communication channel, e.g., as described below.

In other embodiments, devices 102 and/or 104 may be configured to determine the Tx QoE indicator and/or the Rx QoE indicator, for example, based on any additional or alternative parameter, metric, and/or estimation corresponding to the encoded multimedia data.

In some demonstrative embodiments, devices 102 and/or 104 may be configured to determine the channel quality parameter corresponding to the wireless communication channel being used for the session between devices 102 and 104, for example, based at least on a throughput efficiency estimation, for example, a goodput rate estimation, e.g., as described below.

In some demonstrative embodiments, the goodput efficiency may be determined, for example, relative to a video transport quality threshold, for example, a transit time window meeting an allowed decoding arrival time (jitter), e.g., as described below, and/or with respect to any other additional or alternative threshold.

In other embodiments, devices 102 and/or 104 may be configured to determine the Tx QoE indicator and/or the Rx QoE indicator, for example, based on any additional or alternative parameter, metric, and/or estimation corresponding to the wireless communication channel.

In some demonstrative embodiments, device 104 may include a Tx MOS estimator 180 configured to determine the Tx MOS.

In some demonstrative embodiments, Tx MOS estimator 180 may be configured to determine the Tx MOS based, for example, at least on a throughput efficiency parameter corresponding to the encoded multimedia data, e.g., as described below.

In some demonstrative embodiments, Tx QoE estimator 154 may be configured to determine the Tx QoE indicator based at least on the channel quality parameter and a Tx non reference mean opinion score (Tx NRMOS) corresponding to the encoded multimedia data. According to these embodiments, Tx MOS estimator 180 may operate as, and/or perform the functionality of a Tx NRMOS estimator, e.g., as described below.

In some demonstrative embodiments, the throughput efficiency parameter may include a goodput efficiency threshold, e.g., as described below. In other embodiments, the throughput efficiency parameter may include any additional or alternative throughput efficiency parameter.

In some demonstrative embodiments, Tx MOS estimator 180 may include and/or perform the functionality of Tx QoE estimator 154. In other embodiments, Tx MOS estimator 180 and Tx QoE estimator 154 may be implemented as separate modules of device 104.

In some demonstrative embodiments, device 104 may include a channel quality estimator 182 to estimate the channel quality parameter, e.g., as described below.

In some demonstrative embodiments, the channel quality parameter may include, for example, at least a channel congestion parameter corresponding to congestion on the wireless communication channel, e.g., as described below.

In some demonstrative embodiments, channel quality estimator 182 may include and/or may operate as a congestion flow (CF) module configured to determine the channel congestion parameter, e.g., as described below.

In some demonstrative embodiments, the channel quality parameter may include, for example, a network congestion indication and/or a network credit budget indication corresponding to the wireless communication channel, e.g., as described below. In other embodiments, the channel quality parameter may include any additional or alternative parameter and/or indication.

In some demonstrative embodiments, Tx QoE estimator 154 may be configured to determine the Tx QoE indicator based on a Tx frame-per-second (FPS) parameter corresponding to the encoded multimedia data at the Tx side, e.g., as described below.

In some demonstrative embodiments, device 104 may be configured to manage the FPS of the encoded multimedia data, for example, based on the channel quality parameter. For example, encoder 160 may be controlled, e.g., by session manager 184, to increase or decrease the FPS of the encoded multimedia data, for example, based on the channel quality parameter, e.g., as described below.

In some demonstrative embodiments, device 104 may be configured to manage the Tx MOS, for example, based on the FPS of the encoded multimedia data. For example, session manager 184 may be configured to increase or decrease the Tx MOS, for example, based on at least one criterion applied to the FPS, for example, with respect to a maximal Tx FPS, e.g., as described below.

In some demonstrative embodiments, Tx QoE estimator 154 may be configured to determine the at least one Tx QoE indicator, for example, based at least on the Tx MOS and the Tx FPS of the encoded multimedia data t the Tx side, e.g., as described below.

In some demonstrative embodiments, Tx QoE estimator 154 may be configured to determine the at least one Tx QoE indicator, for example, including a first Tx QoE indicator relative to a first threshold, and a second Tx QoE indicator relative to a second threshold. For example, the second threshold may be higher than the first threshold, e.g., as described below.

In some demonstrative embodiments, Tx QoE estimator 154 may be configured to determine a Tx MOS switch high indicator to indicate that the Tx QoE is above a high Tx QoE threshold, e.g., as described below.

In some demonstrative embodiments, Tx QoE estimator 154 may be configured to determine a Tx MOS switch low indicator to indicate that the Tx QoE is below a low Tx QoE threshold, e.g., as described below.

In some demonstrative embodiments, session manager 184 may be configured to manage the session based on the Tx MOS switch low indicator and/or the Tx MOS switch high indicator, e.g., as described below.

In some demonstrative embodiments, one or more functionalities and/or operations of Tx QoE estimator 154, session manager 184, channel quality estimator 182, and/or Tx MOS estimator 180 may be implemented as part of a video controller module.

In some demonstrative embodiments, at least part of the functionality of Tx QoE estimator 154, session manager 184, channel quality estimator 182, and/or Tx MOS estimator 180 may be implemented by an integrated circuit, for example, a chip, e.g., a System on Chip (SoC). In one example, the chip or SoC may optionally be configured to perform one or more functionalities of radio 130 and/or encoder 160. For example, the chip or SoC may include one or more elements of Tx QoE estimator 154, one or more elements of session manager 184, one or more elements of channel quality estimator 182, one or more elements of Tx MOS estimator 180, one or more elements of encoder 160, and/or one or more elements of radio 130. In one example, Tx QoE estimator 154, session manager 184, channel quality estimator 182, Tx MOS estimator 180, encoder 160, and radio 130 may be implemented as part of the chip or SoC.

In other embodiments, Tx QoE estimator 154, session manager 184, channel quality estimator 182, Tx MOS estimator 180, encoder 160, and/or radio 130 may be implemented by one or more additional or alternative elements of device 104.

In some demonstrative embodiments, device 102 may include an Rx MOS estimator 170 configured to determine the Rx MOS.

In some demonstrative embodiments, Rx MOS estimator 170 may be configured to determine the Rx MOS based, for example, at least on a throughput efficiency parameter corresponding to the encoded multimedia data received at device 102, e.g., as described below.

In some demonstrative embodiments, Rx QoE estimator 124 may be configured to determine the Rx QoE indicator based at least on the channel quality parameter and a Rx non reference mean opinion score (Rx NRMOS) corresponding to the encoded multimedia data. According to these embodiments, Rx MOS estimator 170 may operate as, and/or perform the functionality of an Rx NRMOS estimator, e.g., as described below.

In some demonstrative embodiments, the throughput efficiency parameter may include a goodput efficiency threshold, e.g., as described below. In other embodiments, the throughput efficiency parameter may include any additional or alternative throughput efficiency parameter.

In some demonstrative embodiments, Rx MOS estimator 170 may include and/or perform the functionality of Rx QoE estimator 124. In other embodiments, Tx MOS estimator 170 and Rx QoE estimator 124 may be implemented as separate modules of device 102.

In some demonstrative embodiments, device 102 may include a channel quality estimator 172 to estimate the channel quality parameter, e.g., as described below.

In some demonstrative embodiments, the channel quality parameter may include, for example, at least a channel congestion parameter corresponding to congestion on the wireless communication channel, e.g., as described below.

In some demonstrative embodiments, channel quality estimator 172 may include and/or may operate as a congestion flow module configured to determine the channel congestion parameter, e.g., as described below.

In some demonstrative embodiments, the channel quality parameter may include, for example, an Rx jitter delay, e.g., as described below. In other embodiments, the channel quality parameter may include any additional or alternative parameter and/or indication.

In some demonstrative embodiments, Rx QoE estimator 124 may be configured to determine the Rx QoE indicator based on a Rx frame-per-second (FPS) parameter corresponding to the encoded multimedia data received at device 102, e.g., as described below.

In some demonstrative embodiments, device 102 may be configured to manage the Rx MOS, for example, based on the Rx FPS of the encoded multimedia data received at device 102. For example, session manager 174 may be configured to increase or decrease the Rx MOS, for example, based on at least one criterion applied to the Rx FPS, for example, with respect to a maximal Rx FPS, e.g., as described below.

In some demonstrative embodiments, Rx QoE estimator 124 may be configured to determine the at least one Rx QoE indicator, for example, based at least on the Rx MOS and the Rx FPS of the encoded multimedia data received at device 102, e.g., as described below.

In some demonstrative embodiments, Rx QoE estimator 124 may be configured to determine the at least one Rx QoE indicator, for example, including a first Rx QoE indicator relative to a first threshold, and a second Rx QoE indicator relative to a second threshold. For example, the second threshold may be higher than the first threshold, e.g., as described below.

In some demonstrative embodiments, Rx QoE estimator 124 may be configured to determine a Rx MOS switch high indicator to indicate that the Rx QoE is above a high Rx QoE threshold, e.g., as described below.

In some demonstrative embodiments, Rx QoE estimator 124 may be configured to determine a Rx MOS switch low indicator to indicate that the Rx QoE is below a low Rx QoE threshold, e.g., as described below.

In some demonstrative embodiments, session manager 174 may be configured to manage the session based on the Rx MOS switch low indicator and/or the Rx MOS switch high indicator, e.g., as described below.

In some demonstrative embodiments, one or more functionalities and/or operations of Rx QoE estimator 124, session manager 174, channel quality estimator 172, and/or Rx MOS estimator 170 may be implemented as part of a video controller module.

In some demonstrative embodiments, at least part of the functionality of Rx QoE estimator 124, session manager 174, channel quality estimator 172, and/or Rx MOS estimator 170 may be implemented by an integrated circuit, for example, a chip, e.g., a System on Chip (SoC). In one example, the chip or SoC may optionally be configured to perform one or more functionalities of radio 120 and/or decoder 125. For example, the chip or SoC may include one or more elements of Rx QoE estimator 124, one or more elements of session manager 174, one or more elements of channel quality estimator 172, one or more elements of Rx MOS estimator 170, one or more elements of decoder 125, and/or one or more elements of radio 120. In one example, Rx QoE estimator 124, session manager 174, channel quality estimator 172, Rx MOS estimator 170, decoder 125, and radio 120 may be implemented as part of the chip or SoC.

In other embodiments, Rx QoE estimator 124, session manager 174, channel quality estimator 172, Rx MOS estimator 170, decoder 125, and/or radio 120 may be implemented by one or more additional or alternative elements of device 102.

Figure 2:
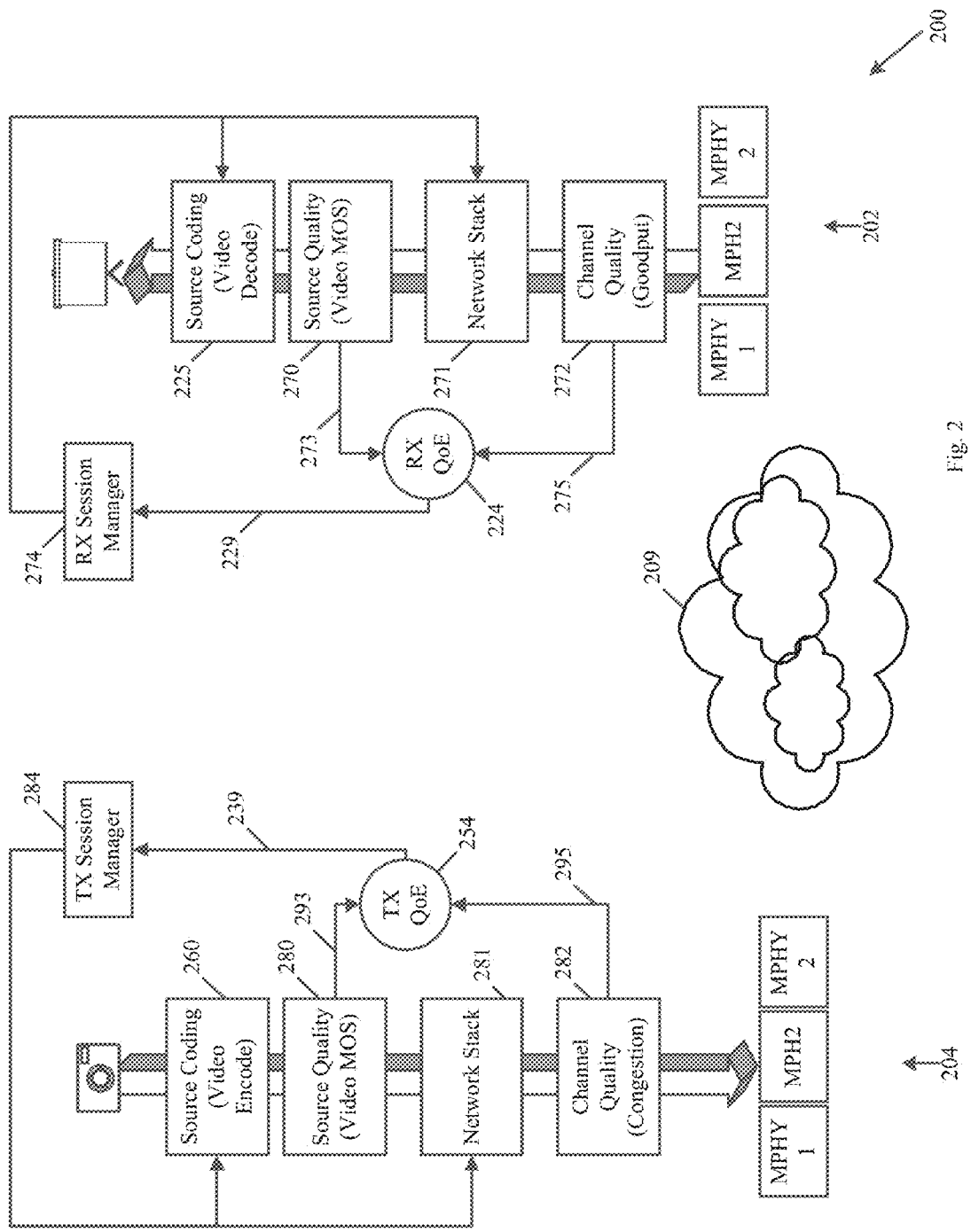
FIG. 2 is a schematic block diagram illustration of elements of a video session management scheme, in accordance with some demonstrative embodiments.

Reference is made to FIG. 2, which schematically illustrates elements of a video session management scheme 200, in accordance with some demonstrative embodiments. For example, one or more elements of video session management scheme 200 may perform he functionality of one or more elements of devices 102 and/or 140 (FIG. 1), e.g., as described below.

In some demonstrative embodiments, as shown in FIG. 2, a Tx side 204 may include a video encoder 260, which may be configured to encode video data to be transmitted to an Rx side 202, which may include a decoder 225 to decode the encoded video data.

In some demonstrative embodiments, as shown in FIG. 2, Tx side 204 may include a network stack 281 and/or Rx side 202 may include a network stack 271, which may be configured to implement a plurality of network protocol layers configured to communicate over a network 209, e.g., during a session.

In some demonstrative embodiments, as shown in FIG. 2, Tx side 204 may include a source quality module 280 to estimate a quality parameter 293 corresponding to the encoded video data generated by encoder 260. For example, source quality module 280 may include a video MOS estimator to estimate a MOS of the encoded video data generated by encoder 260.

In some demonstrative embodiments, as shown in FIG. 2, Tx side 204 may include a channel quality module 282 to estimate a quality parameter 295 corresponding to a communication channel over which the encoded video data is transmitted to Rx side 202. For example, channel quality module 282 may include a channel congestion estimator to estimate a congestion parameter.

In some demonstrative embodiments, as shown in FIG. 2, Tx side 204 may include a Tx QoE estimator 254 configured to generate at least one Tx QoE indicator 239, for example, based on the parameters 293 and 295.

In some demonstrative embodiments, as shown in FIG. 2, Tx side 204 may include a session manager 284 configured to manage the session, for example, based at least on the Tx QoE indicator 239. In some demonstrative embodiments, session manager 284 may be configured to control and/or manage encoder 260 and/or network stack 281, e.g., based on the Tx QoE parameter 239.

In some demonstrative embodiments, one or more elements Tx side 204 may perform one or more functionalities of one or more elements of device 104 (FIG. 1). For example, encoder 260 may perform one or more functionalities of encoder 160 (FIG. 1), session manager 284 may perform one or more functionalities of session manager 184 (FIG. 1), source quality module 280 may perform one or more functionalities of Tx MOS estimator 180 (FIG. 1), network stack 281 may perform one or more functionalities of radio 130 (FIG. 1), channel quality module 282 may perform one or more functionalities of channel quality estimator 182 (FIG. 1), and/or Tx QoE estimator 254 may perform one or more functionalities of Tx QoE estimator 154 (FIG. 1).

In some demonstrative embodiments, as shown in FIG. 2, Rx side 202 may include a source quality module 270 to estimate a quality parameter 273 corresponding to the encoded video data received at Rx side 202. For example, source quality module 270 may include a video MOS estimator to estimate a MOS of the encoded video data received at Rx side 202.

In some demonstrative embodiments, as shown in FIG. 2, Rx side 204 may include a channel quality module 272 to estimate a quality parameter 275 corresponding to the communication channel over which the encoded video data is received at Rx side 202. For example, channel quality module 272 may include a goodput estimator to estimate a goodput parameter.

In some demonstrative embodiments, as shown in FIG. 2, Rx side 202 may include an Rx QoE estimator 224 configured to generate at least one Rx QoE indicator 229, for example, based on the parameters 273 and 275.

In some demonstrative embodiments, as shown in FIG. 2, Rx side 202 may include a session manager 274 configured to manage the session, for example, based at least on the Rx QoE indicator 229. In some demonstrative embodiments, session manager 274 may be configured to control and/or manage decoder 225 and/or network stack 271, e.g., based on the Rx QoE parameter 229.

In some demonstrative embodiments, one or more elements Rx side 202 may perform one or more functionalities of one or more elements of device 102 (FIG. 1). For example, decoder 225 may perform one or more functionalities of decoder 125 (FIG. 1), session manager 274 may perform one or more functionalities of session manager 174 (FIG. 1), source quality module 270 may perform one or more functionalities of Rx MOS estimator 170 (FIG. 1), network stack 271 may perform one or more functionalities of radio 120 (FIG. 1), channel quality module 272 may perform one or more functionalities of channel quality estimator 172 (FIG. 1), and/or Rx QoE estimator 224 may perform one or more functionalities of Rx QoE estimator 124 (FIG. 1).

Figure 3:
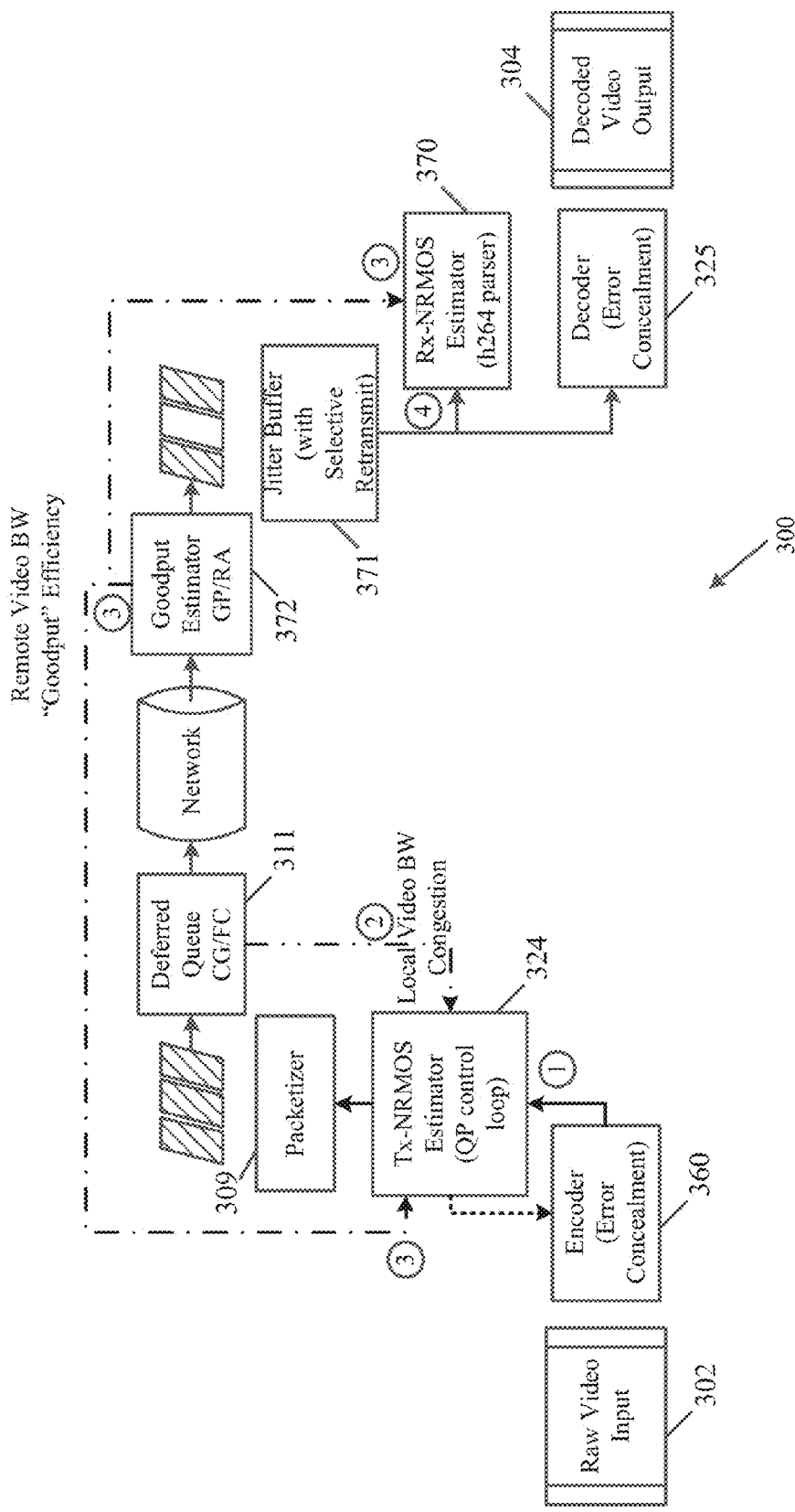
FIG. 3 is a schematic block diagram illustration of elements of a video session path, in accordance with some demonstrative embodiments.

Reference is made to FIG. 3, which schematically illustrates elements of a video session path 300, in accordance with some demonstrative embodiments.

In some demonstrative embodiments, one or more elements of FIG. 3 may be implemented by a transmit (Tx) side, e.g., Tx side 204 (FIG. 2), which may be configured to transmit video data to a receiver (Rx) side, e.g., Rx side 202 (FIG. 2).

In some demonstrative embodiments, an end-to-end video path may be formed by elements of FIG. 3, for example, from left to right.

In some demonstrative embodiments, as shown in FIG. 3, the Tx side, e.g., device 104 (FIG. 1), may include at least one Raw video input 302 to provide video data, an encoder 360 to encode the video data, a Tx side Non-Reference mean opinion score (Tx-NRMOS) module 324, a packetizer 309, and/or a deferred queue congestion and/or Flow Control (CG/FC) module 311, e.g., as described below.

In some demonstrative embodiments, module 324 may be configured to operate as and/or perform one or more functionalities of a Tx MOS estimator, e.g., Tx MOS estimator 180 (FIG. 1), a Tx QoE estimator, e.g., Tx QoE estimator 154 (FIG. 1), and/or a session manager, e.g., session manager 184 (FIG. 1).

In some demonstrative embodiments, as shown in FIG. 3, the Rx side, e.g., device 102 (FIG. 1), may include a Goodput Estimator Receiver side (GP/RA) module 372, a Jitter buffer 371, a Rx side NRMOS (Rx-NRMOS) module 370, a decoder 325 to provide a decoded video output, and/or one or more modules to process the decoded video output, e.g., as described below.

In some demonstrative embodiments, module 370 may be configured to operate as and/or perform one or more functionalities of a Rx MOS estimator, e.g., Rx MOS estimator 170 (FIG. 1), a Rx QoE estimator, e.g., Rx QoE estimator 124 (FIG. 1), and/or a session manager, e.g., session manager 174 (FIG. 1).

In some demonstrative embodiments, a first path (path "1" in FIG. 3) may include a Tx NRMOS path, which may be configured to provide a Tx side non reference mean opinion score, for example, an encoder artifact indication calculated on transmitted encoded video stream, for example, in the form of a predefined subjective quality threshold, e.g., based on a scale ranging from 1 (bad) to 5 (excellent), or any other scale.

In some demonstrative embodiments, a second path (path "2" in FIG. 3) may include a Deferred Queue CG/FC path, which may be configured to provide, for example, a transmit side network indication, for example, a local video traffic congestion indication, and/or a local flow control (frame rate).

In some demonstrative embodiments, a third path (path "3" in FIG. 3) may include a "Goodput Estimator" path, which may be configured, for example, to provide a remote side network indication, for example, a Network capacity bitrate estimation, based on loss and/or delay; usable video packets received within a latency threshold; and/or Frame rate.

In some demonstrative embodiments, a fourth path (path "4" in FIG. 3) may include a Rx NRMOS path, which may be configured to provide a remote side—non reference mean opinion score, for example, an encoder artifact indication calculated on received encoded video stream, for example, in the form of a predefined subjective quality threshold, e.g., based on a scale ranging from 1 (bad) to 5 (excellent), or any other scale.

In some demonstrative embodiments, an NRMOS estimator, for example, a transmitter NRMOS module, e.g., Tx NRMOS module 324, and/or a receiver NRMOS module, e.g., Rx NRMOS module 370, may include or may operate as an encoded video quality predictor, e.g., as described below.

In some demonstrative embodiments, the NR-MOS Estimator may include a video quality measurement block, which may be configured and/or characterized, for example, per encoder behavior.

In some demonstrative embodiments, the NR-MOS estimator may be configured to parse an encoded Network Abstraction Layer (NAL) stream, and to estimate a MOS (predicting FR-MOS measurement), for example, according to P-frame data size, and/or an average quantization parameter (QP), and/or any other parameter.

In some demonstrative embodiments, the NR-MOS estimator may be configured, for example, to perform the functionality of a MOS estimator based on offline training of encoded P frame packet size per QP for each target display, e.g., as described in U.S. patent application Ser. No. 14/218,352, entitled "TECHNIQUES FOR EVALUATING COMPRESSED MOTION VIDEO QUALITY", filed Mar. 18, 2014, the entire disclosure of which is incorporated herein by reference.

In some demonstrative embodiments, the NR-MOS estimator may be configured, for example, to estimate the NRMOS, denoted eMOS, for example, as follows:

$$f_{TC} = \frac{\text{mean}(\text{Bits}_P)}{0.87^{\text{mean}(QP_P)}} \times \frac{fps}{f\_h}$$

$$eMOS = \max\left(\min\left(1 + 3.7\left(1 - \frac{1}{1 + \left(\frac{\text{bitrate}}{f_0}\right)^{f_1}}\right), 5\right), 1\right)$$

where:
$f_0 = \alpha_0 \cdot f_{TC} + \beta_0$
$f_1 = \alpha_1 \cdot f_{TC} + \beta_1$
wherein $(\alpha_n^i, \beta_n^i)$ may be calculated, for example, during offline training, e.g., per encoder.

In one example, the values of $(\alpha_n^i, \beta_n^i)$ may be determined, for example, as follows:

TABLE 1

Example of H.264 high profile Coefficients for HDTV display

| | | |
|---|---|---|
| $f_0$ | $\alpha_0^i$ | 5.10690808868865 |
| | $\beta_0^i$ | 0.110830401791718 |
| $f_1$ | $\alpha_1^i$ | −2.74661993425915 |
| | $\beta_1^i$ | 3.03384346122822 |

In other embodiments, any other values may be used for of $(\alpha_n^i, \beta_n^i)$ and/or any other calculation may be performed.

In other embodiments, the NR-MOS estimator may be configured to perform any other additional or alternative functionality.

In some demonstrative embodiments, the Goodput Estimator 372 may be configured, for example, to determine a Receiver Side Video Throughput efficiency. For example, goodput estimator 372 may perform one or more functionalities of channel quality module 272 (FIG. 1) and/or channel quality module 172 (FIG. 1).

In some demonstrative embodiments, a Goodput Estimator 372 may be implemented, for example, as a Network analyzer block, which may be configured to measure "raw video packet throughput" vs. "usable video packet goodput" arriving at the entry of the Jitter Buffer, e.g., within a pre-defined threshold.

In some demonstrative embodiments, the goodput estimator may perform the functionality of a Network capacity estimator based on a coarse-fine band limited goodput estimation, for example, as described in US Patent Application Publication 2015/0244634, entitled "Apparatus, Method and System of Rate Adaptation Based on Goodput", Published Aug. 27, 2015, the entire disclosure of which is incorporated herein by reference.

In some demonstrative embodiments, statistics of goodput variance may provide, for example, top and bottom thresholds for the available network bandwidth, for example, while actual packet-delay fluctuations may be quantized to estimate instantaneous network capacity.

In other embodiments, the goodput estimator 372 may be configured to feedback to the Tx side an indication of the estimated goodput.

In other embodiments, the goodput estimator 372 may be configured to perform any other additional or alternative channel capacity and/or throughput efficiency estimation.

In other embodiments, any other throughput efficiency estimator may be used.

In some demonstrative embodiments, the Deferred Queue—Sender Side Video Congestion & Flow Control module 311 may be configured to generate a local network congestion indication, network rate estimation, and/or flow control information, for example, to allow a closed loop operation with the Video Encoder Rate controller, e.g., as described below.

In some demonstrative embodiments, the encoder may be configured to decide to reduce bitrate budget to specific frame/scene and/or reduce frame rate.

In some demonstrative embodiments, the visual experience of the viewer may be combined from the fluency (bit rate) and/or details (spatial complexity) of the video, e.g., as described below.

Referring back to FIG. 1, in some demonstrative embodiments, devices 102 and/or 104 may be configured to implement a Mobile video Perceived Quality (PQ) & CAM Switch (SW) Logic, e.g., as described below.

In some demonstrative embodiments, Tx QoE estimator 154 and/or session manager 184 may be configured to implement a Tx PQ-logic; and/or Rx QoE estimator 124 and/or session manager 174 may be configured to implement a Rx PQ-logic, e.g., as described below.

In some demonstrative embodiments, the PQ-logic may be configured to be responsible to generate an indication for video quality derived from network condition. The indication may be generated, for example, at the Tx side, e.g., device 104, and/or the Rx side, e.g., device 102. For example, the indication may be generated at either Tx/Rx side, e.g., independently.

In some demonstrative embodiments, the PQ indication may be configured for use by Mobility Switching Logic, e.g., CAM logic, for example, for wireless interface selection, and/or by any other element.

In some demonstrative embodiments, a PQ Tx side switch (SW) (PQ-TX-SW) may be configured, e.g., at Tx QoE estimator 184 and/or session manager 174, for example, to derive a transmitter side Video quality indication, for example, based on the following criteria:

TABLE 2

| Data | Source | Indication Range |
| --- | --- | --- |
| TX-CG | Congestion flow control - (i) Credit byte budget | [maxDelay × maxBitrate] bytes frame size < current credit budget, decimates FPS |
| TX-FPS | Video controller, adjusts the FPS in a control-loop based on (i) Remote bitrate constraint, (ii) local congestion flow control | [1 ... ½ ... ¼] × max fps (default 30) ≤0.5, triggers MOS decrement >0.67, triggers MOS increment |
| TX-NRMOS | video controller, The NRMOS is adapted in a control-loop, (i) matching the available bit-budget and (ii) derived frame-rate. | [5.0 ... 3.0] MOS ≤3.0, low quality entry trigger >3.5, low quality exit trigger |

The Tx-FPS data may include, for example, Tx side Frame-Per Second (FPS) data, for example, representing a ratio between an FPS of the video and a maximal FPS.

In one example, two thresholds may be used, for example, when probing connectivity interfaces, and/or providing multimedia session QoE score of a multimedia session, for example, for real-time video chat, e.g., as follows:

bool pqTxSwitchLowThreshold( ), is defined as TX-FPS≤0.3, at TX-MOS≤3.0 bool pqTxSwitchHighThreshold( ), is defined as TX-FPS>0.67, at TX-MOS>3.5, may be used, for example as a stickiness threshold, to cross-correlate with the alter-duplex network interfaces.

1

For example, the indicator bool pqTxSwitchLowThreshold( ) may include a Boolean indicator to indicate whether or not the pqTxSwitchLowThreshold( ) is crossed; and/or the indicator bool pqTxSwitchHighThreshold( ) may include a Boolean indicator to indicate whether or not the pqTxSwitchHighThreshold( ) is crossed.

In some demonstrative embodiments, Tx QoE estimator 154 may be configured to generate the indicator pqTxSwitchLowThreshold( ) and/or the indicator bool pqTxSwitchHighThreshold( ), for example, based on the Tx-FPS and/or the Tx-MOS, e.g., according to criterion (1).

In some demonstrative embodiments, a PQ logic at the transmitter side, e.g., implemented as part of Tx QoE estimator 154 and/or session manager 184, may determine at least one quality indication based at least on the Tx NRMOS, and the traffic congestion indication.

For example, the PQ logic at the Tx side may determine the quality indication based on the frame-per-second (FPS) parameter at the transmitter side, the Tx-CG, and the TX-NRMOS, e.g., according to Table 2.

In one example, the Tx MOS estimator 180 may determine the Tx NRMOS based on a throughout efficiency indicator received from the receiver side, e.g., a goodput efficiency indication, as described above.

In some demonstrative embodiments, the Tx MOS 180 estimator may include the PQ logic, e.g., as described above with reference to FIG. 3. In other embodiments, the Tx MOS estimator 180 and the PQ logic may be implemented as separate elements.

In some demonstrative embodiments, the at least one quality indication generated by the Tx PQ logic may include a first indication relative to a low threshold, for example, the indicator boot pqTxSwitchLowThreshold( ); and/or a second indication relative high threshold, for example, the indicator boot pqTxSwitchHighThreshold( ), e.g., as described above.

In some demonstrative embodiments, a PQ Rx side switch (PQ-RX-SW) may be implemented, for example, at the Rx side, e.g., by Rx QoE estimator 124 and/or session manager 174. The PQ-RX-SW may be configured, for example, to derive a receiver side Video quality indication, for example, based on the following criteria:

TABLE 3

| Data | Source | Indication Range |
| --- | --- | --- |
| RX-GOODPUT-EFFI-CIENCY (GP-FX) | goodput calculation, (i) Rate matching efficiency is derived as ~goodput/rx-bandwidth | [... 50% ... 85% ... 95% ...] <50%, poor rate matching <80%, low rate matching efficiency, >85%, good rate matching efficiency >95%, high rate matching efficiency |

TABLE 3-continued

| Data | Source | Indication Range |
|---|---|---|
| RX-NRMOS | jitter-buffer, (i) derived from goodput frames passed to the decoder parsing the NAL stream, and approximating remote-anonymous encoder characteristics | [5.0 . . . 3.0] MOS ≤3.0, low quality entry trigger >3.5, low quality exit trigger |
| RX-FPS | jitter-buffer, (i) accounting for late and dropped frames | [1 . . . ½ . . . ¼ . . .] × max fps ≤0.5, decrement estimated RX-MOS >0.67, increment estimated RX-MOS |
| RX-JITTER-DELAY (RX-JD) | The Receiver Side Jitter buffer delay is exposed from the jitter buffer implementation (used to compensate for network jitter, and packet drop/retry | [min . . . max] sec ≤¼, increment estimated RX-MOS >½, decrement estimated RX-MOS |

The Rx-FPS data may include for example, Rx side FPS data, for example, representing a ratio between an FPS of the video and a maximal FPS.

In one example, thresholds may be used, for example, when probing connectivity interfaces, and/or providing multimedia session QoE score of a multimedia session, for example, for real-time video chat, e.g., as follows:

bool pqRxSwitchLowThreshold( ), is defined as RX-FPS≤¼, at RX-MOS≤3.0, at GP-FX≤80% bool pqRxSwitchHighThreshold( ), is defined as TX-FPS>0.67, at RX-MOS>3.5, at GP-FX>85% at RX-JD<¼ may be used, for example, as a stickiness threshold, to cross-correlate with the alter-duplex network interfaces.

2

In some demonstrative embodiments, Rx QoE estimator 124 may be configured to generate the indicator bool pqRxSwitchLowThreshold( ) and/or the indicator bool pqRxSwitchHighThreshold( ); for example, based on the Rx-FPS and/or the Rx-MOS, e.g., according to criterion (2).

In other embodiments, any other parameters and/or threshold may be used.

Figure 4:
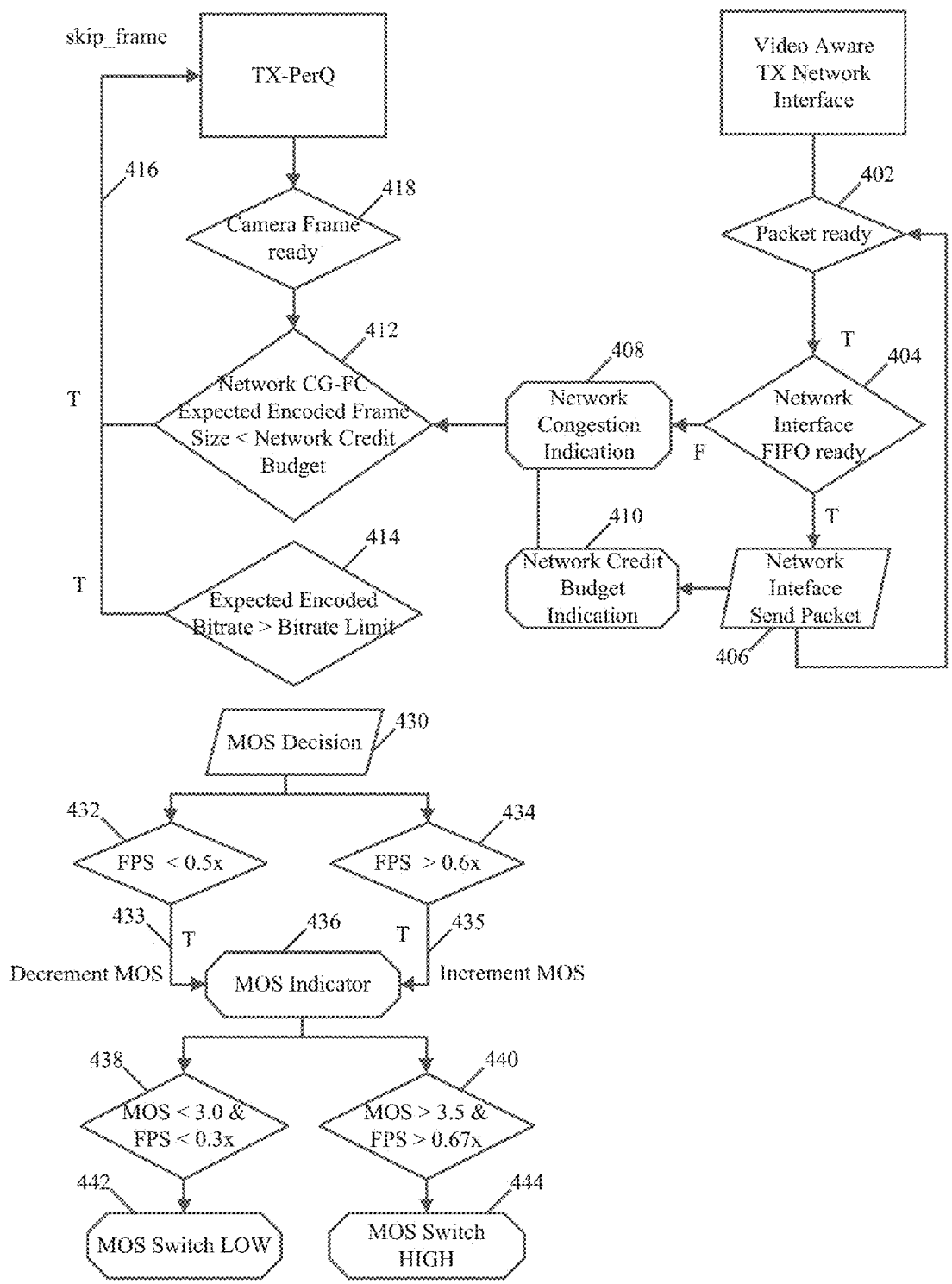
FIG. 4 is a schematic flow chart illustration of a method of determining a Transmit (Tx) Quality of Experience (QoE) indicator, in accordance with some demonstrative embodiments.

Reference is made to FIG. 4, which schematically illustrates a method of determining a Transmit (Tx) Quality of Experience (QoE) indicator, in accordance with some demonstrative embodiments. For example, one or more of the operations of the method of FIG. 4 may be performed by one or more elements of a Tx device, e.g., device 104 (FIG. 1), which is to transmit multimedia data to an Rx device, e.g., device 102 (FIG. 1). For example, one or more of the operations of the method of FIG. 4 may be performed by channel quality estimator 182 (FIG. 1), Tx MOS estimator 180 (FIG. 1), Tx QoE estimator 154 (FIG. 1), and/or session manager 184 (FIG. 1).

In some demonstrative embodiments, one or more operation of the method of FIG. 4 may be performed, for example, to determine the indicator bool pqTxSwitchLowThreshold( ), and/or the indicator bool pqTxSwitchHighThreshold( ), e.g., as described above with reference to Table 2 and/or Criterion (1).

In some demonstrative embodiments, the method may include determining one or more channel quality indicators, as described below.

As indicated at block 402, the method may include waiting until a packet of encoded multimedia data is ready for transmission.

As indicated at block 404, the method may include determining if a network interface buffer, for example, a First in First out (FIFO) buffer, is ready for the packet, for example, if the packet is ready for transmission.

As indicated at block 406, the method may include sending the packet for transmission, for example, if the network interface buffer is ready for the packet.

As indicated at block 408, the method may include determining a network congestion indication, for example, if the network interface buffer is not ready for the packet.

As indicated at block 410, the method may include determining a network credit budget indication, for example, based on the transmission of the packet.

In some demonstrative embodiments, a channel quality estimation module, e.g., channel quality estimator 182 (FIG. 1) and/or channel quality module 282 (FIG. 2), may be configured to perform one or more of the operations of blocks 402, 404, 406, 408, and/or 410.

In some demonstrative embodiments, the method may include updating a Tx FPS of the encoded multimedia data, as described below.

As indicated at block 418, the method may include waiting until a video frame is ready to be sent.

As indicated at block 412, the method may include comparing an expected congestion of video frame, if encoded, to the network credit budget.

As indicated at block 414, the method may include comparing an expected bitrate of the encoded video frame to a bitrate limit.

As indicated by arrow 416, the method may include skipping the video frame, for example, if the expected congestion is less than the network credit budget, and/or if the expected bitrate is greater than the bitrate limit.

In some demonstrative embodiments, a Tx MOS estimator, e.g., Tx MOS estimator 180 (FIG. 1) and/or source quality module 280 (FIG. 2), may be configured to perform one or more of the operations of elements 412, 414, 416, and/or 418.

As indicated at block 430, in some demonstrative embodiments, the method may include generating a Tx MOS decision, e.g., as described below.

As indicated at block 432, the method may include comparing the Tx FPS to a first Tx FPS threshold based on a Tx FPS value, denoted x, e.g., a maximal Tx FPS. For example, the Tx FPS of the video data may be compared to 0.5×.

As indicated at arrow 433, the method may include decreasing the Tx MOS, for example, if the Tx FPS of the video data is less than 0.5×.

As indicated at block 434, the method may include comparing the Tx FPS of the video data to a second Tx FPS threshold based on the Tx FPS value x. For example, the Tx FPS of the video data may be compared to 0.6×.

As indicated at arrow 435, the method may include increasing the Tx MOS, for example, if the Tx FPS of the video data is greater than 0.6×.

As indicated at block 436, the method may include generating a Tx MOS indicator, e.g., as described below. For example, the Tx MOS indication may be generated, e.g., by Tx QoE estimator 154 (FIG. 1), based on the Table 2 and/or Criterion (1) described above.

As indicated at block 438 the method may include comparing the Tx MOS value to a first Tx MOS threshold, e.g., 3.0, and comparing the Tx FPS to a third Tx FPS threshold, e.g., 0.3×.

As indicated at block 442, the method may include generating a Tx MOS switch low indicator, e.g., as described above with reference to Table 2 and Criterion (1), for example, if the Tx MOS value is less than the first Tx MOS threshold, and the Tx FPS is less than the third Tx FPS threshold.

As indicated at block 440 the method may include comparing the Tx MOS value to a second Tx MOS threshold, e.g., 3.5, and comparing the Tx FPS to a fourth Tx FPS threshold, e.g., 0.67×.

As indicated at block 444, the method may include generating a Tx MOS switch high indicator, e.g., as described above with reference to Table 2 and Criterion (1), for example, if the Tx MOS value is greater than the second Tx MOS threshold, and the Tx FPS is greater than the fourth Tx FPS threshold.

Figure 5:
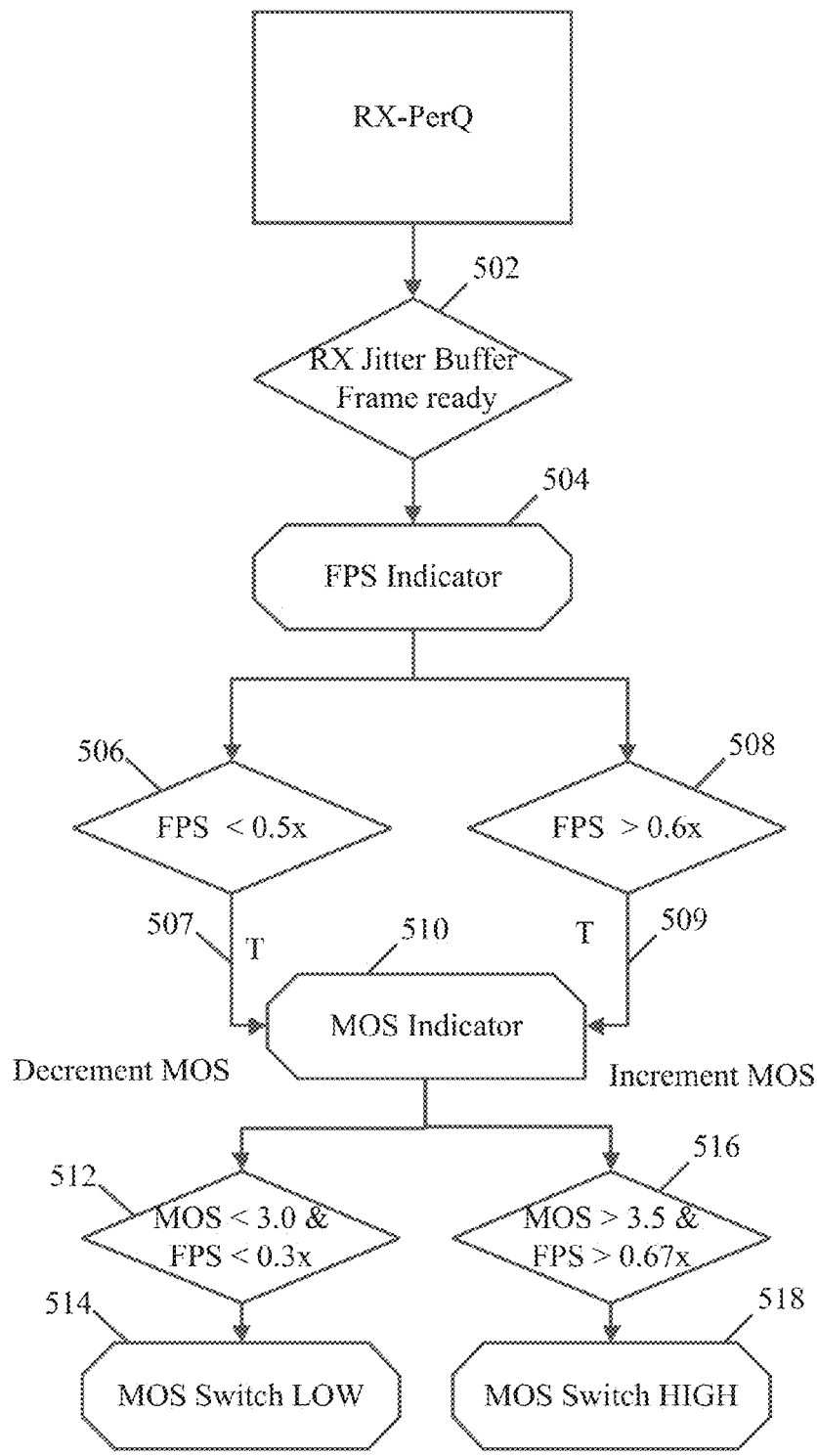
FIG. 5 is a schematic flow chart illustration of a method of determining a Receive (Rx) Quality of Experience (QoE) indicator, in accordance with some demonstrative embodiments.

FIG. 5 is a schematic flow chart illustration of a method of determining a Receive (Rx) Quality of Experience (QoE) indicator, in accordance with some demonstrative embodiments. For example, one or more of the operations of the method of FIG. 5 may be performed by one or more elements of an Rx device, e.g., device 102 (FIG. 1), which is to receive multimedia data from a Tx device, e.g., device 104 (FIG. 1). For example, one or more of the operations of the method of FIG. 5 may be performed by channel quality estimator 172 (FIG. 1), Rx MOS estimator 170 (FIG. 1), Rx QoE estimator 124 (FIG. 1), and/or session manager 174 (FIG. 1).

In some demonstrative embodiments, one or more operation of the method of FIG. 5 may be performed, for example, to determine the indicator bool pqRxSwitchLowThreshold( ), and/or the indicator bool pqRxSwitchHighThreshold( ), e.g., as described above with reference to Table 3 and/or Criterion (2).

As indicated at block 502, the method may include waiting until a received encoded frame is ready, for example, at an Rx Jitter buffer.

As indicated at block 504, the method may include determining an Rx FPS indicator value of the received data based on a timing of the received encoded frame, for example, with respect to the timing of one or more previously received encoded frames. For example, the Rx FPS indicator value may be determined based on number of received frames within a moving time window of a predefined length.

In some demonstrative embodiments, an Rx MOS estimator, e.g., Rx MOS estimator 170 (FIG. 1) and/or source quality module 220 (FIG. 2), may be configured to perform one or more of the operations of blocks 502 and/or 504.

In some demonstrative embodiments, the method may include generating an Rx MOS decision, e.g., as described below. For example, the Rx MOS decision may be generated based on the Table 3 and Criterion (2) described above.

As indicated at block 506, the method may include comparing the Rx FPS of the received data to a first Rx FPS threshold based on an Rx FPS value, denoted x, e.g., a maximal Rx FPS. For example, the Rx FPS of the video data may be compared to 0.5×.

As indicated at arrow 507, the method may include decreasing the Rx MOS, for example, if the Rx FPS of the received data is less than 0.5×.

As indicated at block 508, the method may include comparing the Rx FPS of the received data to a second Rx FPS threshold based on the Rx FPS value x. For example, the Rx FPS of the received data may be compared to 0.6×.

As indicated at arrow 509, the method may include increasing the Rx MOS, for example, if the Rx FPS of the received data is greater than 0.6×.

As indicated at block 510, the method may include generating an Rx MOS indicator, e.g., as described below. For example, the Rx MOS indication may be generated, e.g., by Rx QoE estimator 124 (FIG. 1), based on the Table 3 and/or Criterion (2) described above.

As indicated at block 512 the method may include comparing the Rx MOS value to a first Rx MOS threshold, e.g., 3.0, and comparing the Rx FPS to a third Rx FPS threshold, e.g., 0.3×.

As indicated at block 514, the method may include generating an Rx MOS switch low indicator, e.g., as described above with reference to Table 3 and Criterion (2), for example, if the Rx MOS value is less than the first Rx MOS threshold, and the Rx FPS is less than the third Rx FPS threshold.

As indicated at block 516 the method may include comparing the Rx MOS value to a second Rx MOS threshold, e.g., 3.5, and comparing the Rx FPS to a fourth Rx FPS threshold, e.g., 0.67×.

As indicated at block 518, the method may include generating an Rx MOS switch high indicator, e.g., as described above with reference to Table 3 and Criterion (2), for example, if the Rx MOS value is greater than the second Rx MOS threshold, and the Rx FPS is greater than the fourth Rx FPS threshold.

Figure 6:
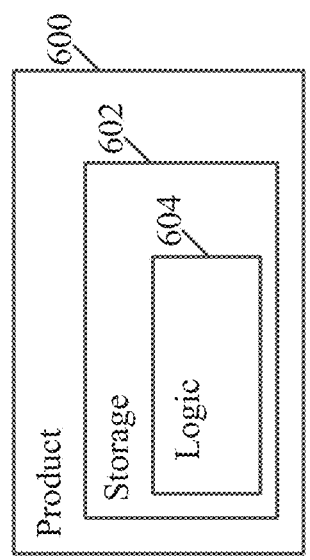
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102, device 104 (FIG. 1), encoder 160 (FIG. 1), radio 130 (FIG. 1), Tx MOS estimator 180 (FIG. 1), channel quality estimator 182 (FIG. 1), Tx QoE estimator 154 (FIG. 1), session manager 184 (FIG. 1), decoder 125 (FIG. 1), radio 120 (FIG. 1), Rx MOS estimator 170 (FIG. 1), channel quality estimator 172 (FIG. 1), Rx QoE estimator 124 (FIG. 1), session manager 124 (FIG. 1), one or more elements of FIGS. 2 and/or 3, and/or to perform one or more operations of the methods of FIGS. 4 and/or 5, and/or to perform one or more operations described herein. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a transmitter configured to transmit encoded multimedia data during a session over a wireless communication channel; and a transmit (Tx) Quality of Experience (QoE) estimator configured to determine at least one Tx QoE indicator corresponding to the session, and to provide the Tx QoE indicator to a session manager of the session, the Tx QoE estimator configured to determine the Tx QoE indicator based at least on a transmit-side mean opinion score (Tx MOS) corresponding to the encoded multimedia data, and a channel quality parameter corresponding to the wireless communication channel.

Example 2 includes the subject matter of Example 1, and optionally, wherein the Tx QoE estimator is configured to determine the Tx QoE indicator based on a Tx frame-per-second (FPS) parameter corresponding to the encoded multimedia data.

Example 3 includes the subject matter of Example 1 or 2, and optionally, comprising a Tx MOS estimator configured to determine the Tx MOS based on a throughput efficiency parameter corresponding to the encoded multimedia data.

Example 4 includes the subject matter of Example 3, and optionally, wherein the throughput efficiency parameter comprises a goodput efficiency threshold.

Example 5 includes the subject matter of Example 3 or 4, and optionally, wherein the Tx MOS estimator comprises the Tx QoE estimator.

Example 6 includes the subject matter of any one of Examples 1-5, and optionally, wherein the at least one Tx QoE indicator comprises a first Tx QoE indicator relative to a first threshold, and a second Tx QoE indicator relative to a second threshold, the second threshold higher than the first threshold.

Example 7 includes the subject matter of any one of Examples 1-6, and optionally, comprising the session manager configured to manage the session based at least on the Tx QoE indicator.

Example 8 includes the subject matter of Example 7, and optionally, wherein the session manager is configured to trigger, based at least on the Tx QoE indicator, one or more operations selected from the group consisting of changing an encoding rate of the encoded multimedia data, and switching the session from the wireless communication channel to another wireless communication channel.

Example 9 includes the subject matter of any one of Examples 1-8, and optionally, wherein the channel quality parameter comprises a channel congestion parameter corresponding to congestion on the wireless communication channel.

Example 10 includes the subject matter of Example 9, and optionally, comprising a congestion-flow module configured to determine the channel congestion parameter.

Example 11 includes the subject matter of any one of Examples 1-10, and optionally, wherein the Tx QoE estimator is configured to determine the Tx QoE indicator based at least on the channel quality parameter and a transmit-side non reference mean opinion score (Tx NRMOS) corresponding to the encoded multimedia data.

Example 12 includes the subject matter of any one of Examples 1-11, and optionally, wherein the encoded multimedia data comprises encoded video data.

Example 13 includes the subject matter of any one of Examples 1-12, and optionally, comprising an encoder to generate the encoded multimedia data.

Example 14 includes the subject matter of any one of Examples 1-13, and optionally, comprising a memory, and a processor.

Example 15 includes an apparatus comprising a receiver configured to receive encoded multimedia data during a session over a wireless communication channel; and a receive (Rx) Quality of Experience (QoE) estimator configured to determine at least one Rx QoE indicator corresponding to the session, and to provide the Rx QoE indicator to a session manager of the session, the Rx QoE estimator configured to determine the Rx QoE indicator based at least on a receive-side mean opinion score (Rx MOS) corresponding to the encoded multimedia data, and a channel quality parameter corresponding to the wireless communication channel.

Example 16 includes the subject matter of Example 15, and optionally, wherein the Rx QoE estimator is configured to determine the Rx QoE indicator based on a Rx frame-per-second (FPS) parameter corresponding to the received encoded multimedia data.

Example 17 includes the subject matter of Example 15 or 16, and optionally, comprising an Rx MOS estimator configured to determine the Rx MOS based on a throughput efficiency parameter corresponding to the encoded multimedia data.

Example 18 includes the subject matter of Example 17, and optionally, wherein the Rx MOS estimator comprises the Rx QoE estimator.

Example 19 includes the subject matter of Example 17 or 18, and optionally, comprising a throughput efficiency estimator to determine the throughput efficiency parameter.

Example 20 includes the subject matter of any one of Examples 17-19, and optionally, wherein the throughput efficiency parameter comprises a goodput efficiency parameter.

Example 21 includes the subject matter of any one of Examples 15-20, and optionally, wherein the at least one Rx QoE indicator comprises a first Rx QoE indicator relative to a first threshold, and a second Rx QoE indicator relative to a second threshold, the second threshold higher than the first threshold.

Example 22 includes the subject matter of any one of Examples 15-21, and optionally, comprising the session manager configured to manage the session based at least on the Rx QoE indicator.

Example 23 includes the subject matter of Example 22, and optionally, wherein the session manager is configured to trigger, based at least on the Rx QoE indicator, one or more operations selected from the group consisting of requesting to change an encoding rate of the encoded multimedia data, and switching the session from the wireless communication channel to another wireless communication channel.

Example 24 includes the subject matter of any one of Examples 15-23, and optionally, wherein the Rx QoE estimator is configured to determine the Rx QoE indicator based at least on the channel quality parameter and a receive-side non reference mean opinion score (Rx NRMOS) corresponding to the encoded multimedia data.

Example 25 includes the subject matter of any one of Examples 15-24, and optionally, comprising a decoder to decode the encoded multimedia data.

Example 26 includes the subject matter of any one of Examples 15-25, and optionally, wherein the encoded multimedia data comprises encoded video data.

Example 27 includes the subject matter of any one of Examples 15-26, and optionally, comprising a memory, and a processor.

Example 28 includes a system of wireless communication comprising a wireless device, the wireless device comprising one or more antennas; a memory; a processor; a transmitter configured to transmit encoded multimedia data during a session over a wireless communication channel; and a transmit (Tx) Quality of Experience (QoE) estimator configured to determine at least one Tx QoE indicator corresponding to the session, and to provide the Tx QoE indicator to a session manager of the session, the Tx QoE estimator configured to determine the Tx QoE indicator based at least on a transmit-side mean opinion score (Tx MOS) corresponding to the encoded multimedia data, and a channel quality parameter corresponding to the wireless communication channel.

Example 29 includes the subject matter of Example 28, and optionally, wherein the Tx QoE estimator is configured to determine the Tx QoE indicator based on a Tx frame-per-second (FPS) parameter corresponding to the encoded multimedia data.

Example 30 includes the subject matter of Example 28 or 29, and optionally, wherein the wireless device comprises a Tx MOS estimator configured to determine the Tx MOS based on a throughput efficiency parameter corresponding to the encoded multimedia data.

Example 31 includes the subject matter of Example 30, and optionally, wherein the throughput efficiency parameter comprises a goodput efficiency threshold.

Example 32 includes the subject matter of Example 30 or 31, and optionally, wherein the Tx MOS estimator comprises the Tx QoE estimator.

Example 33 includes the subject matter of any one of Examples 28-32, and optionally, wherein the at least one Tx QoE indicator comprises a first Tx QoE indicator relative to a first threshold, and a second Tx QoE indicator relative to a second threshold, the second threshold higher than the first threshold.

Example 34 includes the subject matter of any one of Examples 28-33, and optionally, wherein the wireless device comprises the session manager configured to manage the session based at least on the Tx QoE indicator.

Example 35 includes the subject matter of Example 34, and optionally, wherein the session manager is configured to trigger, based at least on the Tx QoE indicator, one or more operations selected from the group consisting of changing an encoding rate of the encoded multimedia data, and switching the session from the wireless communication channel to another wireless communication channel.

Example 36 includes the subject matter of any one of Examples 28-35, and optionally, wherein the channel quality parameter comprises a channel congestion parameter corresponding to congestion on the wireless communication channel.

Example 37 includes the subject matter of Example 36, and optionally, wherein the wireless device comprises a congestion-flow module configured to determine the channel congestion parameter.

Example 38 includes the subject matter of any one of Examples 28-37, and optionally, wherein the Tx QoE estimator is configured to determine the Tx QoE indicator based at least on the channel quality parameter and a transmit-side non reference mean opinion score (Tx NRMOS) corresponding to the encoded multimedia data.

Example 39 includes the subject matter of any one of Examples 28-38, and optionally, wherein the encoded multimedia data comprises encoded video data.

Example 40 includes the subject matter of any one of Examples 28-39, and optionally, wherein the wireless device comprises an encoder to generate the encoded multimedia data.

Example 41 includes a system of wireless communication comprising a wireless device, the wireless device comprising one or more antennas; a memory; a processor; a receiver configured to receive encoded multimedia data during a session over a wireless communication channel; and a receive (Rx) Quality of Experience (QoE) estimator configured to determine at least one Rx QoE indicator corresponding to the session, and to provide the Rx QoE indicator to a session manager of the session, the Rx QoE estimator configured to determine the Rx QoE indicator based at least on a receive-side mean opinion score (Rx MOS) corresponding to the encoded multimedia data, and a channel quality parameter corresponding to the wireless communication channel.

Example 42 includes the subject matter of Example 41, and optionally, wherein the Rx QoE estimator is configured to determine the Rx QoE indicator based on a Rx frame-per-second (FPS) parameter corresponding to the received encoded multimedia data.

Example 43 includes the subject matter of Example 41 or 42, and optionally, wherein the wireless device comprises an Rx MOS estimator configured to determine the Rx MOS based on a throughput efficiency parameter corresponding to the encoded multimedia data.

Example 44 includes the subject matter of Example 43, and optionally, wherein the Rx MOS estimator comprises the Rx QoE estimator.

Example 45 includes the subject matter of Example 43 or 44, and optionally, wherein the wireless device comprises a throughput efficiency estimator to determine the throughput efficiency parameter.

Example 46 includes the subject matter of any one of Examples 43-45, and optionally, wherein the throughput efficiency parameter comprises a goodput efficiency parameter.

Example 47 includes the subject matter of any one of Examples 41-46, and optionally, wherein the at least one Rx QoE indicator comprises a first Rx QoE indicator relative to a first threshold, and a second Rx QoE indicator relative to a second threshold, the second threshold higher than the first threshold.

Example 48 includes the subject matter of any one of Examples 41-47, and optionally, wherein the wireless device comprises the session manager configured to manage the session based at least on the Rx QoE indicator.

Example 49 includes the subject matter of Example 48, and optionally, wherein the session manager is configured to trigger, based at least on the Rx QoE indicator, one or more operations selected from the group consisting of requesting to change an encoding rate of the encoded multimedia data, and switching the session from the wireless communication channel to another wireless communication channel.

Example 50 includes the subject matter of any one of Examples 41-49, and optionally, wherein the Rx QoE estimator is configured to determine the Rx QoE indicator based at least on the channel quality parameter and a receive-side non reference mean opinion score (Rx NRMOS) corresponding to the encoded multimedia data.

Example 51 includes the subject matter of any one of Examples 41-50, and optionally, wherein the wireless device comprises a decoder to decode the encoded multimedia data.

Example 52 includes the subject matter of any one of Examples 41-51, and optionally, wherein the encoded multimedia data comprises encoded video data.

Example 53 includes a method to be performed at a wireless device, the method comprising transmitting encoded multimedia data during a session over a wireless communication channel; determining at least one transmit (Tx) Quality of Experience (QoE) indicator corresponding to the session, based at least on a transmit-side mean opinion score (Tx MOS) corresponding to the encoded multimedia data, and a channel quality parameter corresponding to the wireless communication channel; and providing the Tx QoE indicator to a session manager of the session.

Example 54 includes the subject matter of Example 53, and optionally, comprising determining the Tx QoE indicator based on a Tx frame-per-second (FPS) parameter corresponding to the encoded multimedia data.

Example 55 includes the subject matter of Example 53 or 54, and optionally, comprising determining the Tx MOS based on a throughput efficiency parameter corresponding to the encoded multimedia data.

Example 56 includes the subject matter of Example 55, and optionally, wherein the throughput efficiency parameter comprises a goodput efficiency threshold.

Example 57 includes the subject matter of any one of Examples 53-56, and optionally, wherein the at least one Tx QoE indicator comprises a first Tx QoE indicator relative to a first threshold, and a second Tx QoE indicator relative to a second threshold, the second threshold higher than the first threshold.

Example 58 includes the subject matter of any one of Examples 53-57, and optionally, comprising managing the session based at least on the Tx QoE indicator.

Example 59 includes the subject matter of Example 58, and optionally, comprising triggering, based at least on the Tx QoE indicator, one or more operations selected from the group consisting of changing an encoding rate of the encoded multimedia data, and switching the session from the wireless communication channel to another wireless communication channel.

Example 60 includes the subject matter of any one of Examples 53-59, and optionally, wherein the channel quality parameter comprises a channel congestion parameter corresponding to congestion on the wireless communication channel.

Example 61 includes the subject matter of Example 60, and optionally, comprising determining the channel congestion parameter.

Example 62 includes the subject matter of any one of Examples 53-61, and optionally, comprising determining the Tx QoE indicator based at least on the channel quality parameter and a transmit-side non reference mean opinion score (Tx NRMOS) corresponding to the encoded multimedia data.

Example 63 includes the subject matter of any one of Examples 53-62, and optionally, wherein the encoded multimedia data comprises encoded video data.

Example 64 includes the subject matter of any one of Examples 53-63, and optionally, comprising generating the encoded multimedia data.

Example 65 includes a method to be performed at a wireless device, the method comprising receiving encoded multimedia data during a session over a wireless communication channel; determining at least one Receive (Rx) Quality of Experience (QoE) indicator corresponding to the session, based at least on a receive-side mean opinion score (Rx MOS) corresponding to the encoded multimedia data, and a channel quality parameter corresponding to the wireless communication channel; and providing the Rx QoE indicator to a session manager of the session.

Example 66 includes the subject matter of Example 65, and optionally, comprising determining the Rx QoE indicator based on a Rx frame-per-second (FPS) parameter corresponding to the received encoded multimedia data.

Example 67 includes the subject matter of Example 65 or 66, and optionally, comprising determining the Rx MOS based on a throughput efficiency parameter corresponding to the encoded multimedia data.

Example 68 includes the subject matter of Example 67, and optionally, comprising determining the throughput efficiency parameter.

Example 69 includes the subject matter of Example 67 or 68, and optionally, wherein the throughput efficiency parameter comprises a goodput efficiency parameter.

Example 70 includes the subject matter of any one of Examples 65-69, and optionally, wherein the at least one Rx QoE indicator comprises a first Rx QoE indicator relative to a first threshold, and a second Rx QoE indicator relative to a second threshold, the second threshold higher than the first threshold.

Example 71 includes the subject matter of any one of Examples 65-70, and optionally, comprising managing the session based at least on the Rx QoE indicator.

Example 72 includes the subject matter of Example 71, and optionally, comprising triggering, based at least on the Rx QoE indicator, one or more operations selected from the group consisting of requesting to change an encoding rate of the encoded multimedia data, and switching the session from the wireless communication channel to another wireless communication channel.

Example 73 includes the subject matter of any one of Examples 65-72, and optionally, comprising determining the Rx QoE indicator based at least on the channel quality parameter and a receive-side non reference mean opinion score (Rx NRMOS) corresponding to the encoded multimedia data.

Example 74 includes the subject matter of any one of Examples 65-73, and optionally, comprising decoding the encoded multimedia data.

Example 75 includes the subject matter of any one of Examples 65-74, and optionally, wherein the encoded multimedia data comprises encoded video data.

Example 76 includes a product comprising one or more tangible computer-readable non-transitory storage media comprising computer-executable instructions operable to, when executed by at least one computer processor, enable the at least one computer processor to implement one or more operations at a wireless device, the operations comprising transmitting encoded multimedia data during a session over a wireless communication channel; determining at least one transmit (Tx) Quality of Experience (QoE) indicator corresponding to the session, based at least on a transmit-side mean opinion score (Tx MOS) corresponding to the encoded multimedia data, and a channel quality parameter corresponding to the wireless communication channel; and providing the Tx QoE indicator to a session manager of the session.

Example 77 includes the subject matter of Example 76, and optionally, wherein the operations comprise determining the Tx QoE indicator based on a Tx frame-per-second (FPS) parameter corresponding to the encoded multimedia data.

Example 78 includes the subject matter of Example 76 or 77, and optionally, wherein the operations comprise determining the Tx MOS based on a throughput efficiency parameter corresponding to the encoded multimedia data.

Example 79 includes the subject matter of Example 78, and optionally, wherein the throughput efficiency parameter comprises a goodput efficiency threshold.

Example 80 includes the subject matter of any one of Examples 76-79, and optionally, wherein the at least one Tx QoE indicator comprises a first Tx QoE indicator relative to a first threshold, and a second Tx QoE indicator relative to a second threshold, the second threshold higher than the first threshold.

Example 81 includes the subject matter of any one of Examples 76-80, and optionally, wherein the operations comprise managing the session based at least on the Tx QoE indicator.

Example 82 includes the subject matter of Example 81, and optionally, wherein the operations comprise triggering, based at least on the Tx QoE indicator, one or more operations selected from the group consisting of changing an encoding rate of the encoded multimedia data, and switching the session from the wireless communication channel to another wireless communication channel.

Example 83 includes the subject matter of any one of Examples 76-82, and optionally, wherein the channel quality parameter comprises a channel congestion parameter corresponding to congestion on the wireless communication channel.

Example 84 includes the subject matter of Example 83, and optionally, wherein the operations comprise determining the channel congestion parameter.

Example 85 includes the subject matter of any one of Examples 76-84, and optionally, wherein the operations comprise determining the Tx QoE indicator based at least on the channel quality parameter and a transmit-side non reference mean opinion score (Tx NRMOS) corresponding to the encoded multimedia data.

Example 86 includes the subject matter of any one of Examples 76-85, and optionally, wherein the encoded multimedia data comprises encoded video data.

Example 87 includes the subject matter of any one of Examples 76-86, and optionally, wherein the operations comprise generating the encoded multimedia data.

Example 88 includes a product comprising one or more tangible computer-readable non-transitory storage media comprising computer-executable instructions operable to, when executed by at least one computer processor, enable the at least one computer processor to implement one or more operations at a wireless device, the operations comprising receiving encoded multimedia data during a session over a wireless communication channel; determining at least one Receive (Rx) Quality of Experience (QoE) indicator corresponding to the session, based at least on a receive-side mean opinion score (Rx MOS) corresponding to the encoded multimedia data, and a channel quality parameter corresponding to the wireless communication channel; and providing the Rx QoE indicator to a session manager of the session.

Example 89 includes the subject matter of Example 88, and optionally, wherein the operations comprise determining the Rx QoE indicator based on a Rx frame-per-second (FPS) parameter corresponding to the received encoded multimedia data.

Example 90 includes the subject matter of Example 88 or 89, and optionally, wherein the operations comprise determining the Rx MOS based on a throughput efficiency parameter corresponding to the encoded multimedia data.

Example 91 includes the subject matter of Example 90, and optionally, wherein the operations comprise determining the throughput efficiency parameter.

Example 92 includes the subject matter of Example 90 or 91, and optionally, wherein the throughput efficiency parameter comprises a goodput efficiency parameter.

Example 93 includes the subject matter of any one of Examples 88-92, and optionally, wherein the at least one Rx QoE indicator comprises a first Rx QoE indicator relative to a first threshold, and a second Rx QoE indicator relative to a second threshold, the second threshold higher than the first threshold.

Example 94 includes the subject matter of any one of Examples 88-93, and optionally, wherein the operations comprise managing the session based at least on the Rx QoE indicator.

Example 95 includes the subject matter of Example 94, and optionally, wherein the operations comprise triggering, based at least on the Rx QoE indicator, one or more operations selected from the group consisting of requesting to change an encoding rate of the encoded multimedia data, and switching the session from the wireless communication channel to another wireless communication channel.

Example 96 includes the subject matter of any one of Examples 88-95, and optionally, wherein the operations comprise determining the Rx QoE indicator based at least on the channel quality parameter and a receive-side non reference mean opinion score (Rx NRMOS) corresponding to the encoded multimedia data.

Example 97 includes the subject matter of any one of Examples 88-96, and optionally, wherein the operations comprise decoding the encoded multimedia data.

Example 98 includes the subject matter of any one of Examples 88-97, and optionally, wherein the encoded multimedia data comprises encoded video data.

Example 99 includes an apparatus of wireless communication by a wireless device, the apparatus comprising means for transmitting encoded multimedia data during a session over a wireless communication channel; means for determining at least one transmit (Tx) Quality of Experience (QoE) indicator corresponding to the session, based at least on a transmit-side mean opinion score (Tx MOS) corresponding to the encoded multimedia data, and a channel quality parameter corresponding to the wireless communication channel; and means for providing the Tx QoE indicator to a session manager of the session.

Example 100 includes the subject matter of Example 99, and optionally, comprising means for determining the Tx QoE indicator based on a Tx frame-per-second (FPS) parameter corresponding to the encoded multimedia data.

Example 101 includes the subject matter of Example 99 or 100, and optionally, comprising means for determining the Tx MOS based on a throughput efficiency parameter corresponding to the encoded multimedia data.

Example 102 includes the subject matter of Example 101, and optionally, wherein the throughput efficiency parameter comprises a goodput efficiency threshold.

Example 103 includes the subject matter of any one of Examples 99-102, and optionally, wherein the at least one Tx QoE indicator comprises a first Tx QoE indicator relative to a first threshold, and a second Tx QoE indicator relative to a second threshold, the second threshold higher than the first threshold.

Example 104 includes the subject matter of any one of Examples 99-103, and optionally, comprising means for managing the session based at least on the Tx QoE indicator.

Example 105 includes the subject matter of Example 104, and optionally, comprising means for triggering, based at least on the Tx QoE indicator, one or more operations selected from the group consisting of changing an encoding rate of the encoded multimedia data, and switching the session from the wireless communication channel to another wireless communication channel.

Example 106 includes the subject matter of any one of Examples 99-105, and optionally, wherein the channel quality parameter comprises a channel congestion parameter corresponding to congestion on the wireless communication channel.

Example 107 includes the subject matter of Example 106, and optionally, comprising means for determining the channel congestion parameter.

Example 108 includes the subject matter of any one of Examples 99-107, and optionally, comprising means for determining the Tx QoE indicator based at least on the channel quality parameter and a transmit-side non reference mean opinion score (Tx NRMOS) corresponding to the encoded multimedia data.

Example 109 includes the subject matter of any one of Examples 99-108, and optionally, wherein the encoded multimedia data comprises encoded video data.

Example 110 includes the subject matter of any one of Examples 99-109, and optionally, comprising means for generating the encoded multimedia data.

Example 111 includes an apparatus of wireless communication by a wireless device, the apparatus comprising means for receiving encoded multimedia data during a session over a wireless communication channel; means for determining at least one Receive (Rx) Quality of Experience (QoE) indicator corresponding to the session, based at least on a receive-side mean opinion score (Rx MOS) corresponding to the encoded multimedia data, and a channel quality parameter corresponding to the wireless communication channel; and means for providing the Rx QoE indicator to a session manager of the session.

Example 112 includes the subject matter of Example 111, and optionally, comprising means for determining the Rx QoE indicator based on a Rx frame-per-second (FPS) parameter corresponding to the received encoded multimedia data.

Example 113 includes the subject matter of Example 111 or 112, and optionally, comprising means for determining the Rx MOS based on a throughput efficiency parameter corresponding to the encoded multimedia data.

Example 114 includes the subject matter of Example 113, and optionally, comprising means for determining the throughput efficiency parameter.

Example 115 includes the subject matter of Example 113 or 114, and optionally, wherein the throughput efficiency parameter comprises a goodput efficiency parameter.

Example 116 includes the subject matter of any one of Examples 111-115, and optionally, wherein the at least one Rx QoE indicator comprises a first Rx QoE indicator relative to a first threshold, and a second Rx QoE indicator relative to a second threshold, the second threshold higher than the first threshold.

Example 117 includes the subject matter of any one of Examples 111-116, and optionally, comprising means for managing the session based at least on the Rx QoE indicator.

Example 118 includes the subject matter of Example 117, and optionally, comprising means for triggering, based at least on the Rx QoE indicator, one or more operations selected from the group consisting of requesting to change an encoding rate of the encoded multimedia data, and switching the session from the wireless communication channel to another wireless communication channel.

Example 119 includes the subject matter of any one of Examples 111-118, and optionally, comprising means for determining the Rx QoE indicator based at least on the channel quality parameter and a receive-side non reference mean opinion score (Rx NRMOS) corresponding to the encoded multimedia data.

Example 120 includes the subject matter of any one of Examples 111-119, and optionally, comprising means for decoding the encoded multimedia data.

Example 121 includes the subject matter of any one of Examples 111-120, and optionally, wherein the encoded multimedia data comprises encoded video data.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a transmitter configured to transmit encoded multimedia data during a session over a wireless communication channel; and
a transmit (Tx) Quality of Experience (QoE) estimator configured to determine at least one Tx QoE indicator corresponding to the session, and to provide the at least one Tx QoE indicator to a session manager of the session, the Tx QoE estimator configured to determine the at least one Tx QoE indicator based at least on a transmit-side mean opinion score (Tx MOS) corresponding to the encoded multimedia data, and a channel quality parameter corresponding to the wireless communication channel, the at least one Tx QoE indicator comprising a first Tx QoE indicator relative to a first threshold, and a second Tx QoE indicator relative to a second threshold, the second threshold higher her than the first threshold.

2. The apparatus of claim 1, wherein the Tx QoE estimator is configured to determine the at least one Tx QoE indicator based on a Tx frame-per-second (FPS) parameter corresponding to the encoded multimedia data.

3. The apparatus of claim 1 comprising a Tx MOS estimator configured to determine the Tx MOS based on a throughput efficiency parameter corresponding to the encoded multimedia data.

4. The apparatus of claim 3, wherein said throughput efficiency parameter comprises a goodput efficiency threshold.

5. The apparatus of claim 3, wherein the Tx MOS estimator comprises said Tx QoE estimator.

6. The apparatus of claim 1 comprising said session manager configured to manage said session based at least on said at least one Tx QoE indicator.

7. The apparatus of claim 6, wherein the session manager is configured to trigger, based at least on the at least one Tx QoE indicator, one or more operations selected from the group consisting of changing an encoding rate of the encoded multimedia data, and switching the session from the wireless communication channel to another wireless communication channel.

8. The apparatus of claim 1, wherein the channel quality parameter comprises a channel congestion parameter corresponding to congestion on the wireless communication channel.

9. The apparatus of claim 8 comprising a congestion-flow estimator configured to determine the channel congestion parameter.

10. The apparatus of claim 1, wherein the Tx QoE estimator is configured to determine the at least one Tx QoE indicator based at least on the channel quality parameter and a transmit-side non reference mean opinion score (Tx NRMOS) corresponding to the encoded multimedia data.

11. The apparatus of claim 1, wherein said encoded multimedia data comprises encoded video data.

12. The apparatus of claim 1 comprising an encoder to generate the encoded multimedia data.

13. The apparatus of claim 1 comprising a memory, and a processor.

14. An apparatus comprising:
a receiver configured to receive encoded multimedia data during a session over a wireless communication channel; and
a receive (Rx) Quality of Experience (QoE) estimator configured to determine at least one Rx QoE indicator corresponding to the session, and to provide the at least one Rx QoE indicator to a session manager of the session, the Rx QoE estimator configured to determine the at least one Rx QoE indicator based at least on a receive-side mean opinion score (Rx MOS) corresponding to the encoded multimedia data, and a channel quality parameter corresponding to the wireless communication channel, the at least one Rx QoE indicator comprising a first Rx QoE indicator relative to a first threshold, and a second Rx QoE indicator relative to a second threshold, the second threshold higher than the first threshold.

15. The apparatus of claim 14, wherein the Rx QoE estimator is configured to determine the at least one Rx QoE indicator based on a Rx frame-per-second (FPS) parameter corresponding to the received encoded multimedia data.

16. The apparatus of claim 14 comprising an Rx MOS estimator configured to determine the Rx MOS based on a throughput efficiency parameter corresponding to the encoded multimedia data.

17. The apparatus of claim 14 comprising said session manager configured to manage said session based at least on said at least one Rx QoE indicator.

18. The apparatus of claim 17, wherein the session manager is configured to trigger, based at least on the at least Rx QoE indicator, one or more operations selected from the group consisting of requesting to change an encoding rate of the encoded multimedia data, and switching the session from the wireless communication channel to another wireless communication channel.

19. The apparatus of claim 14 comprising a decoder to decode the encoded multimedia data.

20. A product comprising one or more tangible computer-readable non-transitory storage media comprising computer-executable instructions operable to, when executed by at least one computer processor, enable the at least one computer processor to cause a wireless device to:
transmit encoded multimedia data during a session over a wireless communication channel;
determine at least one transmit (Tx) Quality of Experience (QoE) indicator corresponding to the session, based at least on a transmit-side mean opinion score (Tx MOS) corresponding to the encoded multimedia data, and a channel quality parameter corresponding to the wireless communication channel, the at least one Tx QoE indicator comprising a first Tx QoE indicator relative to a first threshold, and a second Tx QoE indicator relative to a second threshold, the second threshold higher than the first threshold; and
provide the at least one Tx QoE indicator to a session manager of the session.

21. The product of claim 20, wherein the instructions, when executed, cause the wireless device to determine the Tx MOS based on a throughput efficiency parameter corresponding to the encoded multimedia data.

22. A product comprising one or more tangible computer-readable non-transitory storage media comprising computer-executable instructions operable to, when executed by at least one computer processor, enable the at least one computer processor to cause a wireless device to:
receive encoded multimedia data during a session over a wireless communication channel;
determine at least one receive (Rx) Quality of Experience (QoE) indicator corresponding to the session, based at least on a receive-side mean opinion score (Rx MOS) corresponding to the encoded multimedia data, and a channel quality parameter corresponding to the wireless communication channel, the at least one Rx QoE indicator comprising a first Rx QoE indicator relative to a first threshold, and a second Rx QoE indicator relative to a second threshold, the second threshold higher than the first threshold; and
provide the at least one Rx QoE indicator to a session manager of the session.

23. The product of claim 22, wherein the instructions, when executed, cause the wireless device to determine the Rx MOS based on a throughput efficiency parameter corresponding to the encoded multimedia data.

* * * * *

UNITED STATES PATENT AND TRADEMARK OFFICE
CERTIFICATE OF CORRECTION

PATENT NO. : 9,813,523 B2
APPLICATION NO. : 14/864939
DATED : November 7, 2017
INVENTOR(S) : Vered Bar Bracha et al.

It is certified that error appears in the above-identified patent and that said Letters Patent is hereby corrected as shown below:

In the Claims

In Column 35, Line 2, in Claim 1, after "the second threshold higher" delete "her".

Signed and Sealed this
Twentieth Day of March, 2018

Andrei Iancu
*Director of the United States Patent and Trademark Office*